(12) United States Patent
Hoshino et al.

(10) Patent No.: US 10,890,255 B2
(45) Date of Patent: Jan. 12, 2021

(54) COMBINATION OIL RING

(71) Applicant: TPR CO., LTD., Tokyo (JP)

(72) Inventors: Seeroku Hoshino, Tokyo (JP); Hirofumi Osada, Tokyo (JP); Seiji Tamaki, Tokyo (JP)

(73) Assignee: TPR CO., LTD., Tokyo (JP)

( * ) Notice: Subject to any disclaimer, the term of this patent is extended or adjusted under 35 U.S.C. 154(b) by 0 days.

(21) Appl. No.: 16/611,616

(22) PCT Filed: Jul. 30, 2018

(86) PCT No.: PCT/JP2018/028457
§ 371 (c)(1),
(2) Date: Nov. 7, 2019

(87) PCT Pub. No.: WO2019/142380
PCT Pub. Date: Jul. 25, 2019

(65) Prior Publication Data
US 2020/0166135 A1    May 28, 2020

(30) Foreign Application Priority Data

Jan. 16, 2018 (JP) .................................. 2018-004997

(51) Int. Cl.
*F16J 9/06* (2006.01)
(52) U.S. Cl.
CPC ...................... *F16J 9/06* (2013.01)
(58) Field of Classification Search
CPC ........ F16J 9/06; F16J 9/068; F16J 9/12; F16J 9/66; F16J 9/67; F16J 9/145; F16J 9/203;
(Continued)

(56) References Cited

U.S. PATENT DOCUMENTS 2,854,301 A * 9/1958 Lutz .................. F16J 9/145
267/1.5
2,904,377 A * 9/1959 Endres ................ F16J 9/068
277/480
(Continued)

FOREIGN PATENT DOCUMENTS

CN 201347813 Y 11/2009
CN 102162407 A 8/2011
(Continued)

OTHER PUBLICATIONS

Office Action for Chinese Patent Application No. 201880013076.4, dated Dec. 18, 2019.
(Continued)

*Primary Examiner* — Eugene G Byrd
(74) *Attorney, Agent, or Firm* — Merchant & Gould P.C.

(57) ABSTRACT

Under a state in which the combination oil ring is mounted in an oil ring groove before inserted into a cylinder bore, when an inclined surface of an upper ear portion of an expander spacer is held in contact with an inner peripheral surface of an upper segment and an inclined surface of a lower ear portion of the expander spacer is held in contact with an inner peripheral surface of a lower segment, an upper protrusion amount (P1) from an outer peripheral-side end surface of the expander spacer to an outer peripheral surface vertex of the upper segment is larger than a lower protrusion amount (P2) from the outer peripheral-side end surface of the expander spacer to an outer peripheral surface vertex of the lower segment. When the combination oil ring is inserted into the cylinder bore, the sealing performance can be improved to reduce the oil consumption.

13 Claims, 16 Drawing Sheets

(58) Field of Classification Search
CPC ..... F16J 9/26; F16J 9/065; C23C 8/02; C23C 8/26; C25D 5/50; C25D 7/00; C25D 5/36; F02F 5/00
See application file for complete search history.

(56) References Cited

U.S. PATENT DOCUMENTS

| | | | | |
|---|---|---|---|---|
| 3,695,622 | A * | 10/1972 | Davis | F16J 9/063 277/435 |
| 3,759,148 | A * | 9/1973 | Geffroy | F02F 3/00 92/160 |
| 4,111,437 | A * | 9/1978 | Saylor | F16J 9/066 277/435 |
| 4,115,959 | A * | 9/1978 | McCormick | C23C 4/10 51/295 |
| 4,194,747 | A * | 3/1980 | Nisper | F16J 9/069 267/1.5 |
| 4,429,885 | A * | 2/1984 | Chiba | F16J 9/068 267/1.5 |
| 4,542,907 | A * | 9/1985 | Chiba | F16J 9/067 267/1.5 |
| 4,548,416 | A * | 10/1985 | Maeda | F16J 9/069 267/1.5 |
| 4,759,266 | A * | 7/1988 | Murray | F16J 9/066 277/480 |
| 4,762,329 | A * | 8/1988 | Kooroki | F16J 9/066 267/1.5 |
| 5,129,661 | A * | 7/1992 | Ono | F16J 9/066 277/479 |
| 5,195,758 | A * | 3/1993 | Erway | F16J 9/066 267/1.5 |
| 5,469,616 | A * | 11/1995 | Miyazaki | F16J 9/066 29/888.07 |
| 5,718,437 | A * | 2/1998 | Tanaka | F16J 9/066 277/443 |
| 5,794,941 | A * | 8/1998 | Lahrman | F16J 9/063 277/441 |
| 7,036,823 | B2 * | 5/2006 | Takiguchi | F16J 9/064 277/434 |
| 7,044,472 | B2 * | 5/2006 | Takahashi | F16J 9/067 277/434 |
| 7,854,191 | B2 * | 12/2010 | Kariya | F16J 9/068 92/160 |
| 8,835,549 | B2 * | 9/2014 | Gao | C09D 4/00 427/255.14 |
| 9,528,606 | B2 * | 12/2016 | Hitosugi | F16J 9/068 |
| 2002/0070507 | A1 * | 6/2002 | Heraud | F16J 9/062 277/434 |
| 2004/0262847 | A1 * | 12/2004 | Inoue | C23C 8/02 277/443 |
| 2006/0027976 | A1 * | 2/2006 | Usui | F16J 9/062 277/434 |
| 2006/0061043 | A1 * | 3/2006 | Takahashi | F16J 9/068 277/434 |
| 2006/0113730 | A1 * | 6/2006 | Suzuki | F16J 9/062 277/434 |
| 2006/0169135 | A1 * | 8/2006 | Usui | F16J 9/068 92/248 |
| 2008/0122185 | A1 * | 5/2008 | Katou | F16J 9/062 277/434 |
| 2011/0221141 | A1 * | 9/2011 | Ayuzawa | F16J 9/068 277/434 |
| 2013/0181410 | A1 * | 7/2013 | Chiba | F16J 9/20 277/443 |
| 2014/0021686 | A1 * | 1/2014 | Takahashi | F16J 9/066 277/442 |
| 2014/0062030 | A1 * | 3/2014 | Hitosugi | F16J 9/068 277/489 |
| 2014/0265140 | A1 | 9/2014 | Sytsma | |
| 2015/0167844 | A1 * | 6/2015 | Yabune | F16J 9/068 277/477 |
| 2015/0240945 | A1 * | 8/2015 | Favaron | F16J 9/064 277/442 |
| 2017/0175893 | A1 * | 6/2017 | Fujita | F02F 5/00 |

FOREIGN PATENT DOCUMENTS

| | | | |
|---|---|---|---|
| CN | 102168627 | A | 8/2011 |
| CN | 202284502 | U | 6/2012 |
| CN | 103670777 | A | 3/2014 |
| CN | 104005877 | A | 8/2014 |
| CN | 105849444 | A | 8/2016 |
| CN | 110382930 | A | 10/2019 |
| DE | 112014001411 | T5 | 12/2015 |
| EP | 3453927 | A1 | 3/2019 |
| JP | H03-026294 | Y2 | 6/1991 |
| JP | H05-017267 | U | 3/1993 |
| JP | H06-174094 | A | 6/1994 |
| JP | H08-261325 | A | 10/1996 |
| JP | 2000-320672 | A | 11/2000 |
| JP | 2006300224 | A * | 11/2006 ............... F16J 9/068 |
| JP | 2015-117753 | A | 6/2015 |
| JP | 2016-118276 | A | 6/2016 |
| JP | 2016-128700 | A | 7/2016 |
| JP | 2016-194373 | A | 11/2016 |
| JP | 6251850 | B1 | 12/2017 |

OTHER PUBLICATIONS

"Internal combustion engines-Piston rings-Expander/segment oil-control rings", International Standard ISO 6627, Second edition (2011).

International Search Report and Written Opinion for PCT/JP2018/28457, dated Sep. 4, 2018.

Office Action for Japanese Patent Application No. 2018-004997, dated Mar. 20, 2018.

Decision to Grant a Patent for Japanese Patent Application No. 2018-004997, dated Aug. 7, 2018.

Decision to Grant a Patent for Japanese Patent Application No. 2018-097035, dated Aug. 28, 2018.

Office Action for German Patent Application No. 112018001439.8 dated Sep. 2, 2020.

* cited by examiner

|  | COMBI-NATION OIL RING TYPE | COMBI-NATION NOMI-NAL WIDTH h1 [mm] | SEGMENTS | | | |
|---|---|---|---|---|---|---|
|  |  |  | a1u [mm] | h12u [mm] | a1d [mm] | h12d [mm] |
| EXAMPLE 1 | I | 2.0 | 2.05 | 0.4 | 1.87 | 0.4 |
| EXAMPLE 2 | II | 2.0 | 1.87 | 0.4 | 1.87 | 0.4 |
| EXAMPLE 3 | I | 2.0 | 1.99 | 0.4 | 1.87 | 0.4 |
| EXAMPLE 4 | II | 2.0 | 1.87 | 0.4 | 1.87 | 0.4 |
| EXAMPLE 5 | I | 2.0 | 1.93 | 0.4 | 1.87 | 0.4 |
| EXAMPLE 6 | II | 2.0 | 1.87 | 0.4 | 1.87 | 0.4 |
| COMPARATIVE EXAMPLE 1 | III | 2.0 | 1.87 | 0.4 | 1.87 | 0.4 |

FIG. 14A

|  | EXPANDER SPACER | | | | | | | | | |
|---|---|---|---|---|---|---|---|---|---|---|
|  | h13 [mm] | a8u [mm] | a8d [mm] | a3 [mm] | h2 [mm] | h3 [mm] | $\eta$ [DEGREES] | $\theta 1$ [DEGREES] | L [mm] | $\theta u = \theta d$ [DEGREES] |
| EXAMPLE 1 | 1.13 | 1.55 | 1.55 | 0.64 | 0.08 | 0.06 | 8.7 | 29.53 | 1.299 | 15 |
| EXAMPLE 2 | 1.13 | 1.37 | 1.55 | 0.64 | 0.08 | 0.06 | 8.7 | 29.53 | 1.299 | 15 |
| EXAMPLE 3 | 1.13 | 1.55 | 1.55 | 0.64 | 0.08 | 0.06 | 8.7 | 29.53 | 1.299 | 15 |
| EXAMPLE 4 | 1.13 | 1.43 | 1.55 | 0.64 | 0.08 | 0.06 | 8.7 | 29.53 | 1.299 | 15 |
| EXAMPLE 5 | 1.13 | 1.55 | 1.55 | 0.64 | 0.08 | 0.06 | 8.7 | 29.53 | 1.299 | 15 |
| EXAMPLE 6 | 1.13 | 1.49 | 1.55 | 0.64 | 0.08 | 0.06 | 8.7 | 29.53 | 1.299 | 15 |
| COMPARATIVE EXAMPLE 1 | 1.13 | 1.55 | 1.55 | 0.64 | 0.08 | 0.06 | 8.7 | 29.53 | 1.299 | 15 |

FIG. 14B

|  | COMBINATION OIL RING CHARACTERISTIC VALUES | | | | | | | | | | | | | OIL CON-SUMP-TION RATIO |
|---|---|---|---|---|---|---|---|---|---|---|---|---|---|---|
|  | Sf [mm] | Q1= a1u-a8u [mm] | Q2= a1d-a8d [mm] | Q [mm] | $\theta 2$ [DEGREES] | $\alpha (=\beta)$ [DEGREES] | $\theta d-\alpha$ [DEGREES] | Sc [mm] | t1 [mm] | t2 [mm] | P1=Q1-t1 [mm] | P2=Q2-t2 [mm] | P=P1-P2 [mm] |  |
| EXAMPLE 1 | 0.08 | 0.50 | 0.32 | 0.18 | 21.29 | 6.77 | 8.23 | 0.012 | 0.046 | 0.046 | 0.45 | 0.27 | 0.18 | 72 |
| EXAMPLE 2 | 0.08 | 0.50 | 0.32 | 0.18 | 21.29 | 6.77 | 8.23 | 0.012 | 0.046 | 0.046 | 0.45 | 0.27 | 0.18 | 74 |
| EXAMPLE 3 | 0.08 | 0.44 | 0.32 | 0.12 | 21.29 | 4.50 | 10.50 | 0.033 | 0.046 | 0.046 | 0.39 | 0.27 | 0.12 | 86 |
| EXAMPLE 4 | 0.08 | 0.44 | 0.32 | 0.12 | 21.29 | 4.50 | 10.50 | 0.033 | 0.046 | 0.046 | 0.39 | 0.27 | 0.12 | 84 |
| EXAMPLE 5 | 0.08 | 0.38 | 0.32 | 0.06 | 21.29 | 2.25 | 12.75 | 0.056 | 0.046 | 0.046 | 0.33 | 0.27 | 0.06 | 91 |
| EXAMPLE 6 | 0.08 | 0.38 | 0.32 | 0.06 | 21.29 | 2.25 | 12.75 | 0.056 | 0.046 | 0.046 | 0.33 | 0.27 | 0.06 | 93 |
| COMPARATIVE EXAMPLE 1 | 0.08 | 0.32 | 0.32 | 0.00 | 0.00 | 0.00 | 15.00 | 0.08 | 0.046 | 0.046 | 0.27 | 0.27 | 0.00 | 100 |

FIG. 14C

COMBINATION OIL RING

CROSS REFERENCE TO RELATED APPLICATIONS

This application is a U.S. National Stage of International Patent Application No. PCT/JP2018/028457, filed Jul. 30, 2018. Priority under 35 U.S.C. § 119(a) and 35 U.S.C. § 365(b) is claimed from Japanese Patent Applications No. 2018-004997 filed on Jan. 16, 2018, the disclosure of which is also incorporated herein by reference.

TECHNICAL FIELD

The present invention relates to a combination oil ring, which is to be mounted in an oil ring groove of a piston, and is configured to reciprocate inside a cylinder bore in an axial direction of a cylinder together with the piston.

BACKGROUND

Reduction of oil consumption of the internal combustion engine is proceeding. In particular, during a high-speed operation in which an engine rpm is high, the oil consumption is large. As a combination oil ring configured to reduce the oil consumption, for example, Patent Literature 1 and Patent Literature 2 are disclosed.

In a three-piece oil ring disclosed in Patent Literature 1, side-rail inner circumferential locking-portions are provided asymmetrically with respect to a central plane orthogonal to an axis of a spacer so that a tension of a side-rail-upper in a circumferential direction is set larger than a tension of a side-rail-lower in a circumferential direction. Further, in the three-piece oil ring disclosed in Patent Literature 1, a ring width of the side-rail-upper is configured to be larger than a ring width of the side-rail-lower so that the tension of the upper side rail in the circumferential direction is set larger than the tension of the side-rail-lower in the circumferential direction. The three-piece oil ring disclosed in Patent Literature 1 reduces the oil consumption by increasing the tension of the side-rail-upper in the circumferential direction to be larger than the tension of the side-rail-lower in the circumferential direction.

In a combination oil control ring made of steel, which is disclosed in Patent Literature 2, a radial thickness of an upper side rail is set smaller than that of a lower side rail and a radial width of an upper ear portion is set larger than that of a lower ear portion. As a result, one assembly length including the upper side rail from a cylinder wall to one ear portion is equal to the other assembly length including the lower side rail from the cylinder wall to the other ear portion. The combination oil control ring made of steel, which is disclosed in Patent Literature 2, reduces the oil consumption by increasing followability of the upper side rail to a piston wall.

CITATION LIST

Patent Literature

[PTL 1] Japanese Patent Application Laid-Open Publication No. 06-174094 A

[PTL 2] Japanese Utility Model Application Laid-Open Publication No. 05-17267 U

SUMMARY OF INVENTION

Technical Problem

However, the three-piece oil ring disclosed in Patent Literature 1 and the combination oil control ring made of steel, which is disclosed in Patent Literature 2, are not effective as measures to reduce the oil consumption.

As a result of various studies conducted on a behavior of the combination oil ring, the inventor of the present invention has sought measures to improve sealing performance, which are effective measures to reduce the oil consumption. Then, the inventor of the present invention has found out that the sealing performance can be improved by generating an upward bending moment in an expander spacer under a closed state. The "closed state" denotes a state in which the combination oil ring is mounted in an oil ring groove of a piston and is inserted into a cylinder bore together with the piston. Under the closed state, on a cross section of the combination oil ring, which is taken along an axial direction of the cylinder, a center axis of the expander spacer is rotated and inclined upward at a predetermined angle over an entire circumference of the expander spacer in a circumferential direction of the combination oil ring, an inclined surface of an upper ear portion of the expander spacer is held in contact with an inner peripheral surface of an upper segment, and an inclined surface of a lower ear portion of the expander spacer is held in contact with an inner peripheral surface of a lower segment. Further, an upper surface of an inner peripheral surface-side part of the upper segment is brought into pressure contact with an oil ring groove upper surface over an entire circumference of the upper-segment, and a lower surface of an inner peripheral surface-side part of the lower segment is brought into pressure contact with an oil ring groove lower surface over an entire circumference of the lower-segment. An outer peripheral surface vertex of the upper segment and an outer peripheral surface vertex of the lower segment are brought into pressure contact with a wall surface of the cylinder bore over the entire circumference of the upper segment and the entire circumference of the lower segment, respectively. A "free state" denotes a state in which the combination oil ring is mounted in the oil ring groove of the piston before being inserted into the cylinder bore together with the piston. Specifically, under the free state, on the cross section of the combination oil ring, which is taken along the axial direction of the cylinder, the inclined surface of the upper ear portion of the expander spacer is held in contact with the inner peripheral surface of the upper segment and the inclined surface of the lower ear portion of the expander spacer is held in contact with the inner peripheral surface of the lower segment.

An object to be achieved by the present invention is to provide a combination oil ring capable of improving sealing performance to reduce oil consumption.

Solution to Problem

According to one embodiment of the present invention, there is provided a combination oil ring to be mounted in an oil ring groove of a piston, which is configured to be reciprocated inside a cylinder bore in an axial direction of a cylinder with the piston, the combination oil ring including: when a cylinder head side in the axial direction of the cylinder is an upper side and a side away from the cylinder head is a lower side, an upper segment arranged on the upper side; a lower segment arranged on the lower side independently of the upper segment; and an expander spacer arranged between the upper segment and the lower segment, the expander spacer including: an upper ear portion, which is formed at an upper part of an inner peripheral-side end portion so as to protrude upward therefrom, and has an inclined surface contacting with an inner peripheral surface of the upper segment and pressing the upper segment; a lower ear portion, which is formed at a lower part of an inner peripheral-side end portion so as to protrude downward therefrom, and has an inclined surface contacting with an inner peripheral surface of the lower segment and pressing the lower segment; an upper support portion, which is formed at an upper part of an outer peripheral-side end portion so as to protrude upward therefrom, and has an upper surface contacting with a lower surface of the upper segment and supporting the upper segment; and a lower support portion, which is formed at a lower part of an outer peripheral-side end portion so as to protrude downward therefrom, and has a lower surface contacting with an upper surface of the lower segment and supporting the lower segment, wherein the expander spacer excluding the upper ear portion and the lower ear portion has a maximum width in the axial direction of the cylinder, which is defined between an outer peripheral-side end portion of the upper support portion and an outer peripheral-side end portion of the lower support portion, wherein a state in which the expander spacer, the upper segment, and the lower segment are mounted in the oil ring groove before being inserted into the cylinder bore is defined as a free state, wherein, under the free state in which the inclined surface of the upper ear portion of the expander spacer is held in contact with the inner peripheral surface of the upper segment and the inclined surface of the lower ear portion of the expander spacer is held in contact with the inner peripheral surface of the lower segment on a cross section of the combination oil ring, which is taken along the axial direction of the cylinder, when a protrusion amount from an outer peripheral-side end surface of the expander spacer to an outer peripheral surface vertex of the upper segment is an upper protrusion amount P1, a protrusion amount from the outer peripheral-side end surface of the expander spacer to an outer peripheral surface vertex of the lower segment is a lower protrusion amount P2, and a difference between the upper protrusion amount P1 and the lower protrusion amount P2 is P, a condition of P=P1−P2>0 is satisfied, wherein, on the cross section of the combination oil ring, which is taken along the axial direction of the cylinder, under a state in which the combination oil ring is inserted into the cylinder bore, a center axis of the expander spacer is rotated and inclined upward at a predetermined angle over an entire circumference of the expander spacer in a circumferential direction of the combination oil ring, the inclined surface of the upper ear portion of the expander spacer is held in contact with the inner peripheral surface of the upper segment, the inclined surface of the lower ear portion of the expander spacer is held in contact with the inner peripheral surface of the lower segment, an upper surface of an inner peripheral surface-side part of the upper segment is held in pressure contact with the oil ring groove upper surface over an entire circumference of the upper segment, a lower surface of an inner peripheral surface-side part of the lower segment is held in pressure contact with the oil ring groove lower surface over an entire circumference of the lower segment, and the outer peripheral surface vertex of the upper segment and the outer peripheral surface vertex of the lower segment are held in pressure contact with a bore wall surface over the entire circumference of the upper segment and the entire circumference of the lower segment, respectively. P is also referred to as "upper-lower protrusion amount difference".

In the combination oil ring according one embodiment of the present invention, when, in a radial direction of the combination oil ring, a thickness of the upper segment is set to a1u [mm],
a thickness of the lower segment is set to a1d [mm],
a spacer thickness of the expander spacer on the upper segment side is set to a8u [mm], and
a spacer thickness of the expander spacer on the lower segment side is set to a8d [mm], it is preferred that the following Expression (1), Expression (2), and Expression (3) be satisfied:

$$Q1 = a1u - a8u > P1 > 0 \tag{1},$$

$$Q2 = a1d - a8d > P2 > 0 \tag{2, and}$$

when a condition of Q1−P1=Q2−P2 is satisfied, Q1−Q2=P1−P2>0 is established, and $$Q = Q1 - Q2 = (a1u - a8u) - (a1d - a8d) > 0 \tag{3}$$

where Q1 is a difference between the thickness a1u of the upper segment 2 and the upper spacer thickness a8u, and is referred to as "upper apparent protrusion amount", Q2 is a difference between the thickness a1d of the lower segment 3 and the lower spacer thickness a8d, and is referred to as "lower apparent protrusion amount", and Q is a difference (Q1-Q2) between the upper apparent protrusion amount Q1 and the lower apparent protrusion amount Q2, and is also referred to as "upper-lower apparent protrusion amount difference".

It is preferred that, when Expression (4) is satisfied, the combination oil ring according to one embodiment of the present invention satisfy Expression (5).

$$a8u = a8d \tag{4}$$

$$Q = a1u - a1d > 0 \tag{5}$$

It is preferred that, when Expression (6) is satisfied, the combination oil ring according to one embodiment of the present invention satisfy Expression (7).

$$a1u = a1d \tag{6}$$

$$a8u < a8d \tag{7}$$

It is preferred that, in the combination oil ring according to one embodiment of the present invention, Q1 or Q2 and Q satisfy Expression (8) and Expression (9).

$$0.15 \leq Q1 \text{ or } Q2 \leq 0.65 \tag{8}$$

$$0.06 \leq Q \leq 0.23 \tag{9}$$

In the combination oil ring according to one embodiment of the present invention, when a nominal width dimension of the upper segment is set to h12u [mm], a nominal width dimension of the lower segment is set to h12d [mm], an upper ear angle, which is an acute angle formed between the inclined surface of the upper ear portion of the expander spacer and the axial direction of the cylinder, is set to θu [degrees], and a lower ear angle, which is an acute angle formed between the inclined surface of the lower ear portion of the expander spacer and the axial direction of the cylinder, is set to θd [degrees], it is preferred that the nominal width dimension h12u or the nominal width dimension h12d fall within a range of from 0.3 [mm] to 0.6 [mm] and the upper ear angle θu or the lower ear angle θd fall within a range of from 5 [degrees] to 30 [degrees], and that the difference Q between the upper apparent protrusion amount Q1 and the lower apparent protrusion amount Q2 satisfy a dimensional range expressed by the following Expression (10) or a dimensional range expressed by the following Expression (11):

when the nominal width dimension h12u or the nominal width dimension h12d falls within a range of from 0.3 [mm] to 0.45 [mm], $$0.085 \text{ [mm]} \leq Q \leq 0.18 \text{ [mm]} \quad (10),\text{ or}$$

when the nominal width dimension h12u or the nominal width dimension h12d is larger than 0.45 [mm] and equal to or smaller than 0.60 [mm], $$0.110 \text{ [mm]} \leq Q \leq 0.23 \text{ [mm]} \quad (11).$$

In the combination oil ring according to one embodiment of the present invention, when a nominal width dimension of the upper segment is set to h12u [mm], and a nominal width dimension of the lower segment is set to h12d [mm], it is preferred that the following Expression (12) be satisfied:

$$h12u < h12d \quad (12).$$

In the combination oil ring according to one embodiment of the present invention, wherein, in a case in which a side clearance in the combination oil ring under the free state is a free-state side clearance Sf [mm], and a state in which the piston including the combination oil ring assembled therein is mounted inside the cylinder bore is replaced to a closed state in which the combination oil ring is equipped in a measurement device having an annular shape, in which the measurement device has a recessed groove with a nominal width h1 [mm] of the combination oil ring, the recessed groove corresponds to the oil ring groove of the piston with a nominal diameter d1 [mm] of the combination oil ring, and that replacement conforms to JIS B8032-1:2016 (ISO 6621-1:2007) and JIS B8032-2:2016 (ISO 6621-2:2003), when a side clearance in the combination oil ring under the closed state is a closed-state side clearance Sc [mm], it is preferred that the free-state side clearance Sf and the closed-state side clearance Sc have a relationship of Sc<Sf.

Advantageous Effects of Invention

According to one embodiment of the present invention, the combination oil ring capable of improving the sealing performance to reduce the oil consumption is provided.

BRIEF DESCRIPTION OF DRAWINGS

FIG. 14(A) is a table for explaining specific numerical values of Examples 1, 2, 3, 4, 5, and 6, and Comparative Example 1, that is, for explaining specific numerical values of a combination nominal width h1 [mm] and segments.

FIG. 14(B) is a table for explaining specific numerical values of Examples 1, 2, 3, 4, 5, and 6, and Comparative Example 1, that is, for explaining specific numerical values of the expander spacer.

FIG. 14(C) is a table for explaining specific numerical values of Examples 1, 2, 3, 4, 5, and 6, and Comparative Example 1, that is, for explaining specific numerical values of combination oil ring characteristic values and oil consumption ratios.

DESCRIPTION OF EMBODIMENTS

Figure 1A:
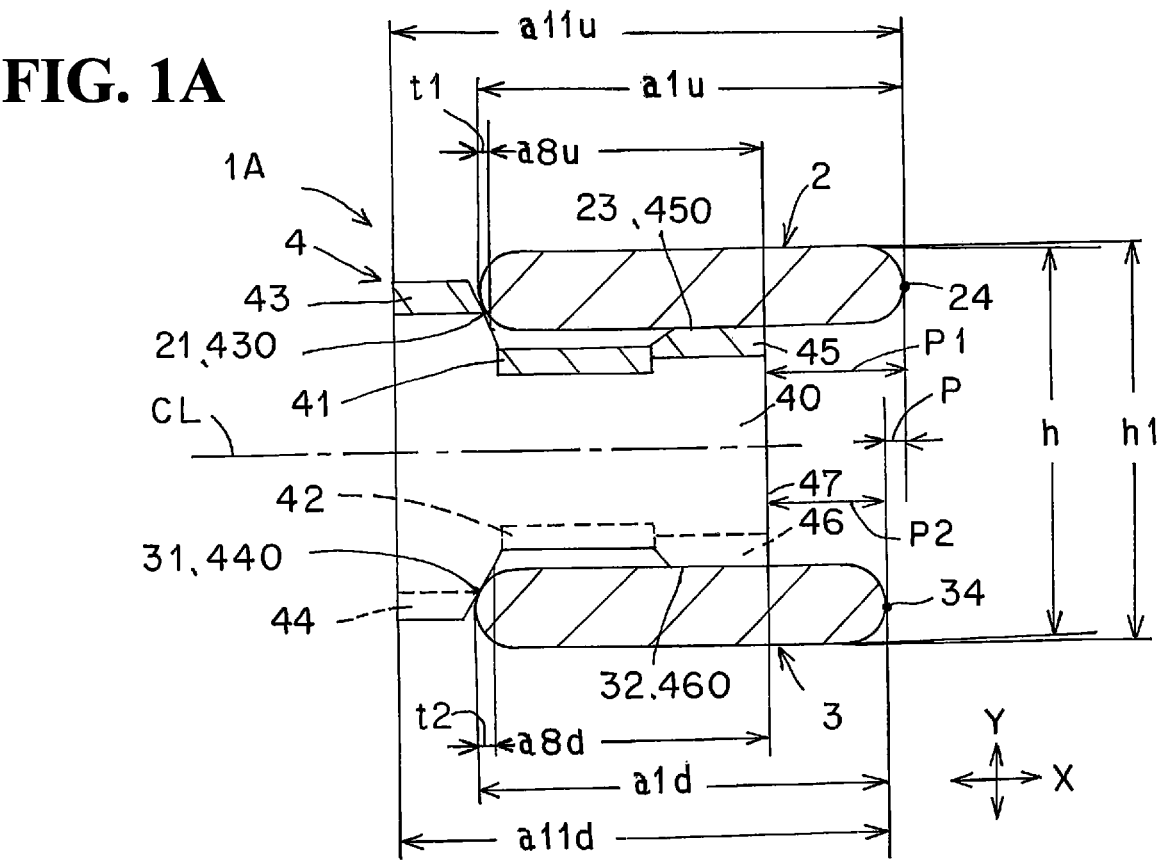
FIG. 1(A) is a schematic sectional view of a combination oil ring in a free state according to a first embodiment of the present invention.

Now, three embodiments (examples) of a combination oil ring and two modification examples of an expander spacer according to the present invention are described in detail with reference to the drawings. Dimensions, materials, shapes, and relative arrangements of components described in the following embodiments are not intended to limit the scope of the present invention thereto, and are merely explanatory examples unless otherwise specifically noted. Specifically, the embodiments and modification examples described below are five examples of a plurality of embodiments and modification examples of the present invention. The combination oil ring according to the present invention is applied not only to a reciprocating internal combustion engine but also to a reciprocating air compressor. A structure and a behavior of the combination oil ring in the reciprocating internal combustion engine are mainly described herein.

Appellations, symbols, and basic dimensions of components and portions used in the present invention conform to JIS B8032-1:2016 (ISO 6621-1:2007), JIS B8032-2:2016 (ISO 6621-2:2003), and JIS B8032-13:1998 (ISO 627: 2000). In general, however, the appellations, the symbols, and the basic dimensions are recommended ones for transactions with design manufacturers of reciprocating internal combustion engines and do not necessarily precisely meet the above-mentioned standards.

In this specification and the accompanying claims, the term "upper" or "upper side" denotes the cylinder-head side in an axial direction of a cylinder, and the term "lower" or "lower side" denotes the side away from the cylinder head in the axial direction of the cylinder. Further, in this specification and the accompanying drawings, a cylinder axis CCL direction for the combination oil ring is referred to as a Y direction (axial direction). On a cross section of the combination oil ring, which is taken along the Y direction, a center axis CL direction (radial direction), which is orthogonal to the cylinder axis CCL and passes through a center of the combination oil ring, is referred to as an X direction.

Further, in this specification, measurements in the Y direction is also referred to as a width (height), and measurements in the X direction is also referred to as a thickness (length). In this case, units are bracketed. Further, in this specification and the accompanying drawings, the alphabets "u" and "d" in the reference symbols are used to denote, on the cross section of the combination oil ring, which is taken along Y direction, the upper side with respect to the center axis CL with "u" and the lower side with respect to the center axis CL with "d" so that the upper side and the lower side can be distinguished from each other for actual measurements of dimensions. In this specification, the accompanying claims, and the accompanying drawings, a length is expressed in [mm] and an angle is expressed in [degrees] as numerical units and units of measurement.

Further, in schematic views included in the accompanying drawings, illustrated components and portions and actual components and portions are sometimes different from each other in shape, dimensions, and the like. In particular, characteristic components and portions are illustrated larger than actual dimensions.

In schematic sectional views included in the accompanying drawings, a behavior of the combination oil ring is captured on one cross section. However, the behavior of the combination oil ring is observed over an entire circumference thereof.

(Description of Configuration of First Embodiment)

FIG. 1 to FIG. 15 explain a combination oil ring according to a first embodiment of the present invention. Now, a configuration of the combination oil ring according to the first embodiment is described. In FIGS., the combination oil ring according to the first embodiment (a1u>a1d) is illustrated and shown as a combination oil ring 1A.

(Description of Combination Oil Ring 1A)

Figure 4:
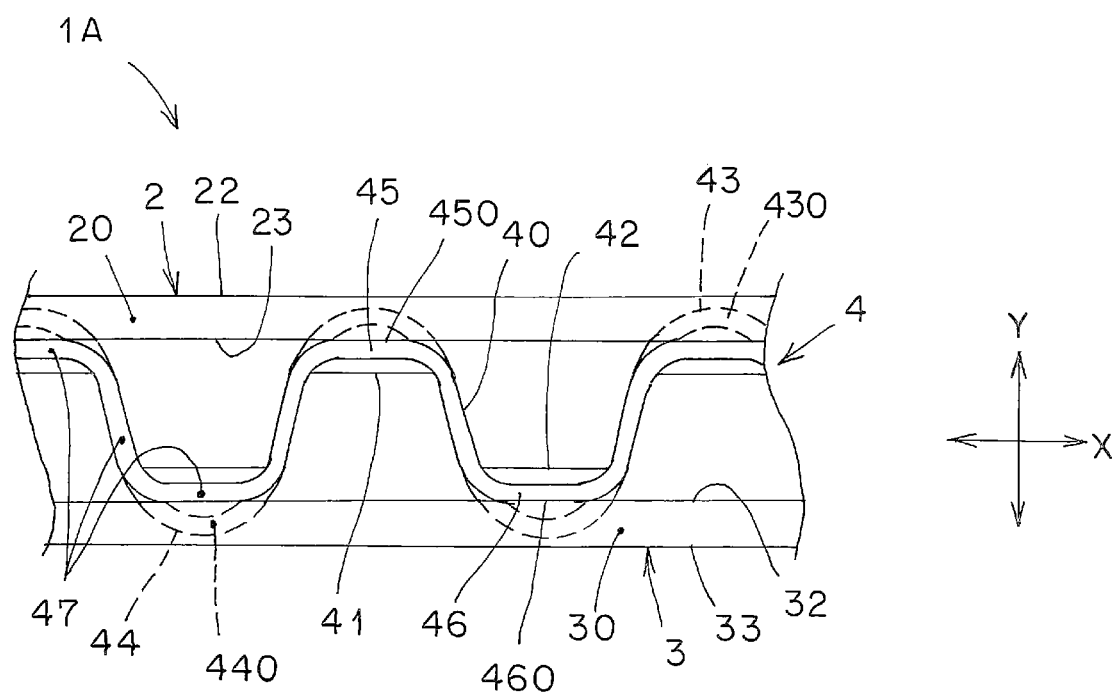
FIG. 4 is a partial schematic front view (partial schematic side view) for illustrating the combination oil ring.

The combination oil ring 1A is a general three-piece oil ring, as illustrated in FIG. 1(A) and FIG. 4. The combination oil ring 1A includes an upper segment (upper rail) 2, a lower segment (lower rail) 3, and an expander spacer (spacer 4). The upper segment 2 is arranged on the upper side. The lower segment 3 is arranged on the lower side. The expander spacer 4 is arranged between the upper segment 2 and the lower segment 3.

(Description of Upper Segment 2 and Lower Segment 3)

The upper segment 2 has an outer peripheral surface 20, an inner peripheral surface 21, an upper surface 22, and a lower surface 23, whereas the lower segment 3 has an outer peripheral surface 30, an inner peripheral surface 31, an upper surface 32, and a lower surface 33, as illustrated in FIG. 1(A), FIG. 2(B), FIG. 2(C), and FIG. 4. The upper segment 2 has a joint 25 (see FIG. 7), whereas the lower segment 3 has a joint 35 (see FIG. 7).

Each of a base material of the upper segment 2 and a base material of the lower segment 3 contains steel as a main component. Although there are exemplified stainless steel and carbon steel as representative examples of steel, steel other than those exemplified above may be used. Although each of the outer peripheral surface of the upper segment 2 and the outer peripheral surface of the lower segment 3 may be covered with a hard coating such as a hard chromium plating coating, a CrN-based PVD coating, or a DLC coating or have a nitrided layer formed thereon, coating of the outer peripheral surfaces are not limited thereto.

The base material of the upper segment 2 and the base material of the lower segment 3 may have different material properties. The outer peripheral surface of the upper segment 2 and the outer peripheral surface of the lower segment 3 may be different hard coatings. For the upper surface and the lower surface of the upper segment 2 and the upper surface and the lower surface of the lower segment 3, nitrided layers may be formed on the upper surface 22 and the lower surface 23 of the upper segment 2 or the upper surface 32 and the lower surface 33 of the lower segment 3.

The appellations, the symbols, and the dimensions of the upper segment 2 and the lower segment 3 in a free state are now described with reference to FIG. 2(B) and FIG. 2(C).

Figure 1B:
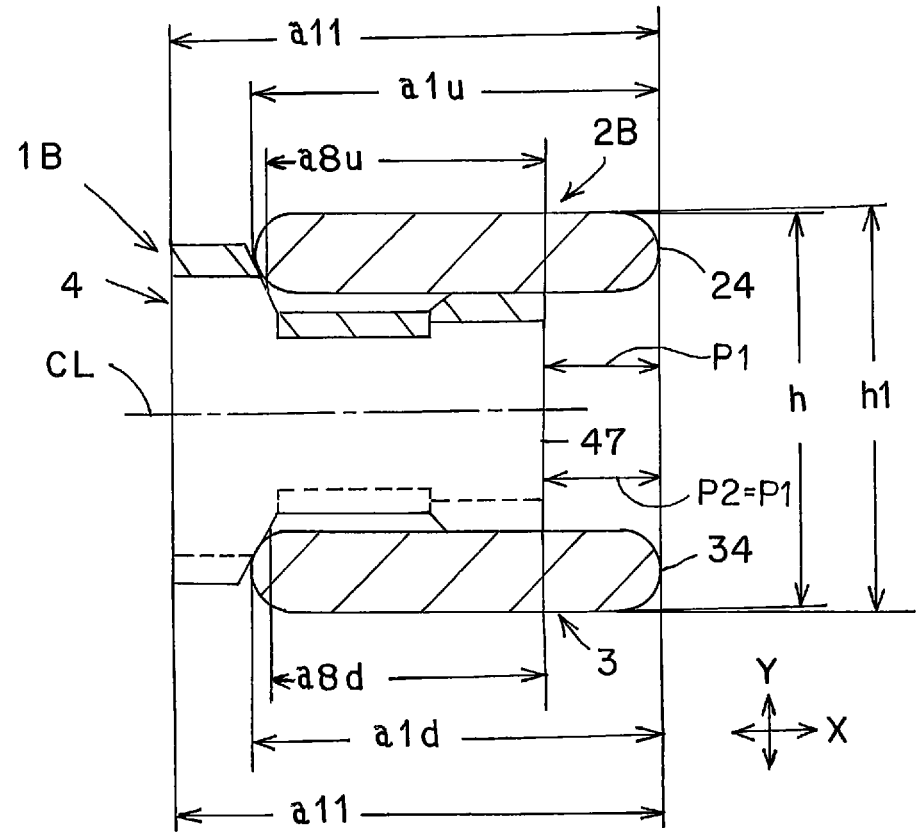
FIG. 1(B) is a schematic sectional view of a combination oil ring of a comparative example in a free state.
Figure 2A:
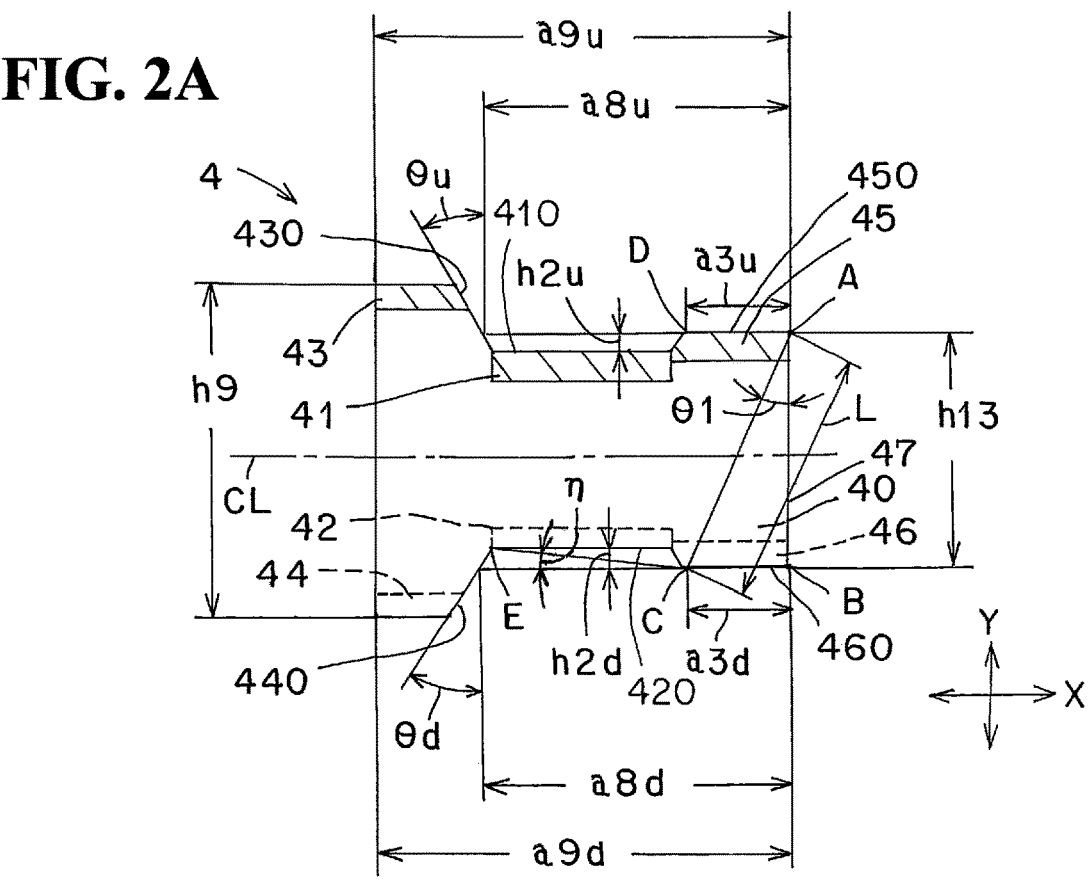
FIG. 2(A) is a schematic sectional view for illustrating an expander spacer of the combination oil ring.
Figure 2B:
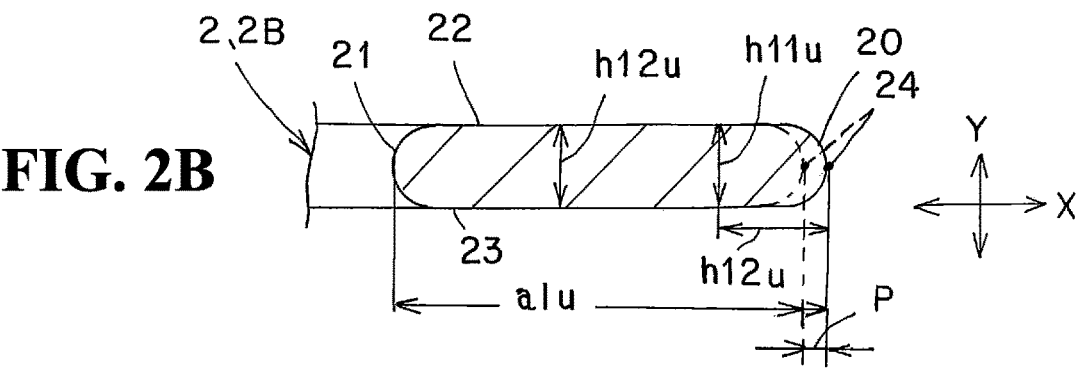
FIG. 2(B) is a schematic sectional view for illustrating an upper segment of the combination oil ring.

In FIG. 2(B), h12u is an upper segment nominal width, a1u is an upper segment thickness, and h11u is a value of an upper segment width, which is actually read by a micrometer with a resolution of up to $\frac{1}{1,000}$ [mm]. Specifically, h11u is a width of the upper segment 2 on the outer peripheral side and is a dimension to be used to obtain a combination nominal width h1 (combination nominal width of the combination oil ring 1A, 1B (described later); see FIG. 1(A), FIG. 1(B), FIG. 5(A), and FIG. 5(B)). The measurement position of the value of the upper segment width h11u is the position on the inner peripheral surface 21 side by the dimension h12u [mm] from an outer peripheral surface vertex 24.

Figure 2C:
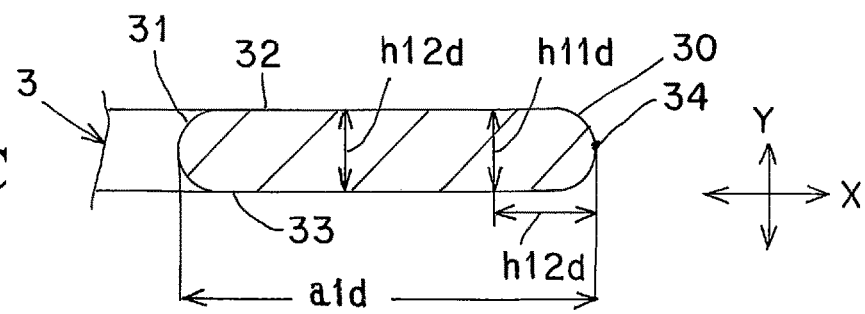
FIG. 2(C) is a schematic sectional view for illustrating a lower segment of the combination oil ring.
Figure 3:
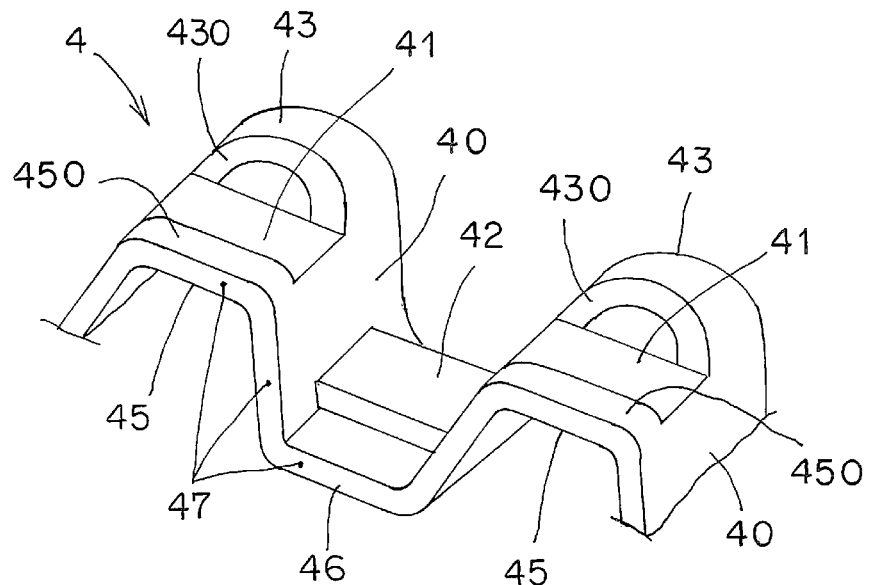
FIG. 3 is a partial schematic perspective view (schematic view as seen obliquely from above) for illustrating the expander spacer.

In FIG. 2(C), h12d is a lower segment nominal width, a1d is a lower segment thickness, and h11d is a value of a lower segment width, which is actually read by a micrometer with a resolution of up to $\frac{1}{1,000}$ [mm]. Specifically, h11d is a width of the lower segment 3 on the outer peripheral side and is a dimension to be used to obtain the combination nominal width h1. The measurement position of the value of the upper segment width h11d is the position on the inner peripheral surface 31 side by the dimension h12d [mm] from an outer peripheral surface vertex 34.

(Description of Expander Spacer 4)

A base material of the expander spacer 4 contains steel as a main component. Although there are exemplified stainless steel and carbon steel as representative examples of steel, steel other than those exemplified above may be used. The expander spacer 4 includes connecting pieces 40, upper pieces 41, lower pieces 42, upper ear portions 43, lower ear portions 44, upper support portions 45, and lower support portions 46, as illustrated in FIG. 1(A), FIG. 2(A), FIG. 3, and FIG. 4. The expander spacer 4 has a vertically symmetric shape with respect to the center axis CL. The expander spacer 4 has a joint (not shown).

The expander spacer 4 is formed of a flat plate-shaped metal to have the connecting pieces 40, the upper pieces 41, and the lower pieces 42, which are formed so as to be corrugated in the Y direction and extend in a circumferential direction of the expander spacer 4. Specifically, a plurality of the upper pieces 41 and a plurality of the lower pieces 42 are arranged alternately in the circumferential direction so as to be apart in the Y direction and the circumferential direction. The upper piece 41 and the lower piece 42, which are adjacent to each other, are connected to each other through intermediation of the connecting piece 40.

The upper ear portion 43 is formed at an upper part of an inner peripheral-side end portion of the upper piece 41 so as to protrude upward therefrom. Specifically, the upper ear portion 43 is formed upright at the inner peripheral-side end portion of the upper piece 41. An outer peripheral-side surface of the upper ear portion 43 forms an upper ear inclined surface 430. The upper year inclined surface 430 is brought into contact with the inner peripheral surface 21 of the upper segment 2 to press the upper segment 2 toward the outer peripheral side.

The lower ear portion 44 is formed at a lower part of an inner peripheral-side end portion of the lower piece 42 so as to protrude downward therefrom. Specifically, the lower ear portion 44 is formed upright at the inner peripheral-side end portion of the lower piece 42. An outer peripheral-side surface of the lower ear portion 44 forms a lower ear inclined surface 440. The lower year inclined surface 440 is brought into contact with the inner peripheral surface 31 of the lower segment 3 to press the lower segment 3 toward the outer peripheral side.

The upper support portion 45 is formed at an upper part of an outer peripheral-side end portion of the upper piece 41 so as to protrude upward therefrom. Specifically, the upper support portion 45 is formed upright at the outer peripheral-side end portion of the upper piece 41. An upper surface 450 of the upper support portion 45 is brought into contact with the lower surface 23 of the upper segment 2 to support the upper segment 2.

The lower support portion 46 is formed at a lower part of an outer peripheral-side end portion of the lower piece 42 so as to protrude downward therefrom. Specifically, the lower support portion 46 is formed upright at the outer peripheral-side end portion of the lower piece 42. A lower surface 460 of the lower support portion 46 is brought into contact with the upper surface 32 of the lower segment 3 to support the lower segment 3.

On each of the upper surface 450 of the upper support portion 45 and the lower surface 460 of the lower support portion 46, a slight inclination is provided so that the inner circumferential side end thereof approaches the central axis CL. With the inclinations, an outer peripheral-side part of the upper surface 450 of the upper support portion 45 is brought into contact with the lower surface 23 of the upper segment 2, whereas an outer peripheral-side part of the lower surface 460 of the lower support portion 46 is brought into contact with the upper surface 32 of the lower segment 3. A degree of each of the inclination of the upper surface 450 of the upper support portion 45 and the inclination of the lower surface 460 of the lower support portion 46 is set to be about 3 [degrees] or smaller with respect to the center axis CL.

An outer peripheral-side end surface 47 of the expander spacer 4, specifically, outer peripheral-side end surfaces of the connecting pieces 40, outer peripheral-side end surfaces of the upper support portions 45, and outer peripheral-side end surfaces of the lower support portions 46 are positioned in the same plane in the circumferential direction and have a corrugated shape. An inner peripheral-side end surface of the expander spacer 4, specifically, inner peripheral-side end surfaces of the connecting pieces 40, inner peripheral-side end surfaces of the upper ear portions 43, and inner peripheral-side end surfaces of the lower ear portions 44 are positioned in the same plane in the circumferential direction and similarly have a corrugated shape, although the corrugated shape is different from the outer peripheral-side end surfaces 47.

As the expander spacer, there is exemplified a type other than the above-mentioned expander spacer 4. This type of expander spacer is formed into a corrugated shape in the X direction, and has support portions on the outer peripheral side and ear portions on the inner peripheral side. An upper part and a lower part thereof are symmetric in the circumferential direction with respect to the center axis CL. Even in this type of expander spacer, a degree of the inclination of each of the support portions is set to be about 3 [degrees] or smaller with respect to the center axis CL.

The appellations, the symbols, and the dimensions of the expander spacer 4 in a free state are now described with reference to FIG. 2(A).

In FIG. 2(A), h9 is an expander width, a8u is an upper spacer thickness, a3u is an upper support portion length, a9u is an upper expander radial thickness, h2u is an upper spacer support portion height, θu is an upper ear angle, a8d is a lower spacer thickness, a3d is a lower support portion length, a9d is a lower expander radial thickness, h2d is a lower spacer support portion height, and θd is a lower ear angle. The upper spacer thickness a8u and the lower spacer thickness a8d are dimensions in the radial direction at positions of the upper ear portion 43 and the lower ear portion 44, which form the expander spacer width h13 (maximum width of the expander spacer 4 in the Y direction excluding the ear portions) in the Y direction. The upper ear angle θu and the lower ear angle θd may be the same or may be different from each other, and are generally designed to fall within a range of from 5 [degrees] to 30 [degrees].

On a sectional shape of FIG. 2(A), a position of the upper support upper surface 450 of the outer peripheral-side end surface 47 of the expander spacer 4 is set as a position A, and a position of the lower support lower surface 460 of the outer peripheral-side end surface 47 of the expander spacer 4 is set as a position B, the position A and position B define the expander spacer width h13. The position A is a corner position formed by the upper support upper surface 450 of the upper support portion 45 and the outer peripheral-side end surface 47 of the expander spacer 4. The position B is a corner position formed by the lower support lower surface 460 of the lower support portion 46 and the outer peripheral-side end surface 47 of the expander spacer 4.

Further, on the sectional shape of FIG. 2(A), a corner position formed by the lower support lower surface 460 of the lower support portion 46 and the inner peripheral-side end surface of the expander spacer 4 is set as a position C. A corner position formed by the upper support upper surface 450 of the upper support portion 45 and the inner peripheral-side end surface of the expander spacer 4 is set as a position D. A position of a base of the lower ear portion 44 at the lower piece 42 of the expander spacer 4 is set as a position E. The position E is a corner position formed by a lower surface (420 in FIG. 19) of the lower piece 42 and the lower ear inclined surface 440 of the lower ear portion 44 of the expander spacer 4.

On the sectional shape of FIG. 2(A), a length of a line segment AC between the position A and the position C is set as L [mm]. An angle formed between the line segment AC and the outer peripheral-side end surface 47 of the expander spacer 4 is set as θ1 [degrees]. An angle formed between a line segment CE that connects the position C and the position E and the center axis CL is η [degrees].

Th value h13 is read by a micrometer with a resolution of ¹⁄₁,₀₀₀ mm. The values a9u and a9d are read by the micrometer with a resolution of ¹⁄₁₀₀ mm. The values a8u, a3u, h2u, θu, a8d, a3d, h2d, θd, and η are directly measured from a shape obtained by enlargement with a 50-fold magnification for both lateral and longitudinal magnifications with use of a profile measurement device. The angle η is defined with respect to the center axis CL of the expander spacer 4 and is measured as an angle formed with respect to a straight line perpendicular to the outer peripheral-side end surface 47 of the expander spacer 4 on the shape obtained with use of the above-mentioned profile measurement device, and therefore an angle formed between the line segment CE and the lower piece 42 is not to be measured as the angle η. The length L of the line segment AC and the angle θ1 are calculated from measured values of h13 and a3d, specifically, L=(h13²+ a3d²)$^{0.5}$ [mm] and θ1=tan$^{-1}$ (a3d/h13) [degrees].

(Description of Combination Oil Ring 1A in Free State)

FIG. 1(A) is a schematic sectional view for illustrating the combination oil ring 1A in the free state. The combination oil ring 1A is formed by arranging the upper segment 2 on the upper side, the lower segment 3 on the lower side, and the expander spacer 4 between the upper segment 2 and the lower segment 3.

The appellations, the symbols, and the dimensions of the combination oil ring 1A in the free state are now described with reference to FIG. 1(A). In FIG. 1(A), a11u is an upper combination thickness on the upper segment 2 side, a11d is a lower combination thickness on the lower segment 3 side, and h1 is the combination nominal width. A combination width h is obtained as a sum of the width h11u (nominal width h12u) of the upper segment 2 on the outer peripheral side, the width h11d (nominal width h12d) of the lower segment 3 on the outer peripheral side, and the expander spacer width h13 of the expander spacer 4, which are illustrated in FIG. 2(A), FIG. 2(B), and FIG. 2(C), on the outer peripheral side of the combination oil ring 1A. Specifically, h=h11u+h11d+h13 is established. Note that h and h1 in FIG. 1(A) mean the difference between actually measured values.

Figure 5A:
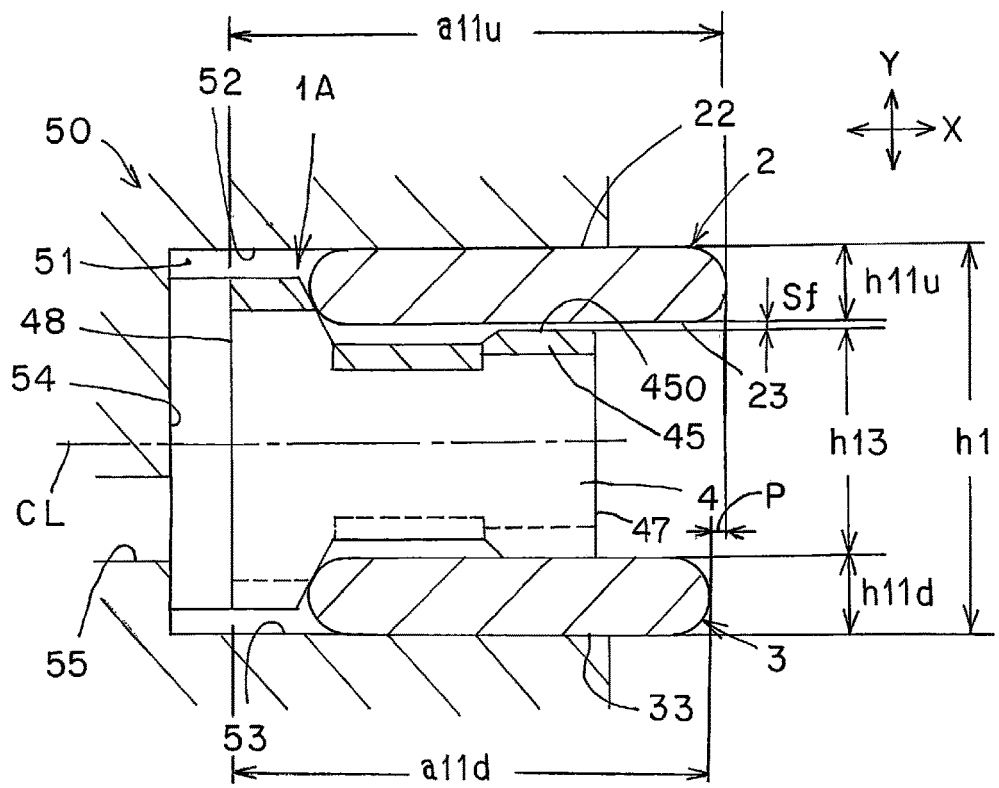
FIG. 5(A) is a schematic sectional view of the combination oil ring according to the first embodiment of the present invention, in which the combination oil ring is mounted in an oil ring groove of a piston.
Figure 6A:
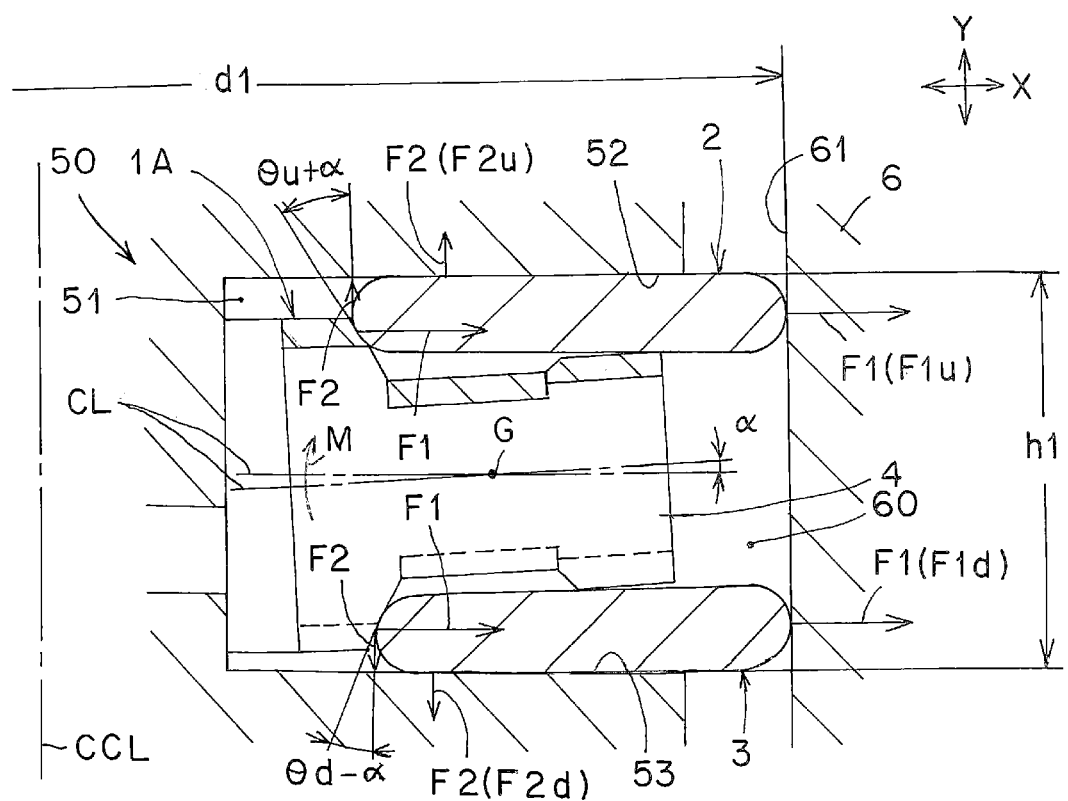
FIG. 6(A) is a schematic sectional view of the combination oil ring according to the first embodiment (a1u>a1d) of the present invention in the closed state, in which the combination oil ring is inserted in a cylinder bore.

The combination oil ring 1A illustrated in FIG. 1(A) is in the free state corresponding to a state before being mounted in an oil ring groove (see FIG. 5(A)) and being inserted into a cylinder bore (see FIG. 6(A)). Under the free state, on a cross section of the combination oil ring, which is taken along the axial direction of the cylinder, the inclined surface 430 (upper ear inclined surface) of the upper ear portion 43 of the expander spacer 4 is held in contact with the inner peripheral surface 21 of the upper segment 2 and the inclined surface 440 (lower ear inclined surface) of the lower ear portion 44 of the expander spacer 4 is held in contact with the inner peripheral surface 31 of the lower segment 3. In the combination oil ring 1A in the free state described above, an upper protrusion amount P1 from the outer peripheral-side end surface 47 of the expander spacer 4 to the outer peripheral surface vertex 24 of the upper segment 2 is larger than a lower protrusion amount P2 from the outer peripheral-side end surface 47 of the expander spacer 4 to the outer peripheral surface vertex 34 of the lower segment 3. Specifically, when a difference between the upper protrusion amount P1 and the lower protrusion amount P2 is P, P=P1− P2>0 is established. The combination oil ring 1A illustrated in FIG. 1(A) has the same protrusion amounts even under a state in which the combination oil ring 1A is mounted in the oil ring groove (see FIG. 5(A)). In a combination oil ring 1B illustrated in FIG. 1(B), P1=P2 is established, therefore, P=0.

In FIG. 1(A), the upper segment inner peripheral surface 21 has an arc-like shape with a curvature radius of h12u/2 [mm], and the lower segment inner peripheral surface 31 has an arc-like shape with a curvature radius of h12d/2 [mm]. The upper surface 22 and the lower surface 23 of the upper segment 2 are parallel to the center axis CL of the expander spacer 4. The upper surface 32 and the lower surface 33 of the lower segment 3 are parallel to the center axis CL of the expander spacer 4. The upper segment inner peripheral surface 21 is held in line contact with the upper ear inclined surface 430 of the expander spacer 4, whereas the lower segment inner peripheral surface 31 is held in line contact with the lower ear inclined surface 440 of the expander spacer 4. In FIG. 1(A), t1 [mm] is a distance in the X direction between the position of the upper ear portion 43 in the X direction, at which the upper spacer thickness a8u is defined, and the inner peripheral-side vertex of the upper segment 2, and t2 [mm] is a distance in the X direction between the position of the lower ear portion 44 in the X direction, at which the lower spacer thickness a8d is defined, and the inner peripheral-side vertex of the lower segment 3. Specifically, when θu is the upper ear angle and θd is the lower ear angle, t1 and t2 are calculated by the following expressions.

$$t1=(1-\tan((90-\theta u)/2))\times h12u/2,$$

$$t2=(1-\tan((90-\theta d)/2))\times h12d/2,$$

where θu and θd are expressed in [degrees] as units.

Further, in the combination oil ring 1A according to the first embodiment (of the present invention), each of h12u and h12d falls within a range of from 0.3 [mm] to 0.6 [mm], a difference between h12u and h12d is equal to or smaller than 0.15, h12d is larger than h12u, and each of θu and θd falls within a range of from 5 degrees to 30 degrees.

When the thickness of the upper segment 2 is a1u [mm], the thickness of the lower segment 3 is a1d [mm], the upper spacer thickness is a8u [mm], the lower spacer thickness is a8d [mm], the upper apparent protrusion amount Q1 is equal to a1u−a8u, and lower apparent protrusion amount Q2 is equal to a1d−a8d, based on relationships of P1=Q1−t1, P2=Q2−t2, and P=P1−P2>0, $$P = P1 - P2 = (Q1 - t1) - (Q2 - t2) = (Q1 - Q2) - (t1 - t2)$$

is obtained. Thus, a condition of Q1−Q2>t1−t2 is required to be satisfied.

In this case, when the difference between Q1 and Q2 is Q, Q=Q1−Q2 is established.

Although Q1, Q2, or Q can easily be obtained by measuring a product, P1, P2, or P cannot be obtained without calculating t1 and t2.

Thus, in place of the relationship of P=P1−P2>0, a relationship of Q=Q1−Q2>t1−t2 is considered. At least large values are desirable as the differences P and Q.

i) In the combination oil ring 1A, based on the relationships of t1=Q1−P1 and t2=Q2−P2, when a condition of t1=t2 is satisfied, P=P1−P2=Q1−Q2=Q>0 is established. Specifically, the upper protrusion amount P1 and the upper apparent protrusion amount Q1 are equal to each other, the lower protrusion amount P2 and the lower apparent protrusion amount Q2 are equal to each other, and the upper-lower protrusion amount difference P and the upper-lower apparent protrusion amount difference Q are also equal to each other.

Further, Q=Q1−Q2=a1u−a8u−(a1d−a8d)>0 is established.

ii) In the combination oil ring 1A, when the values t1 and t2 are different from each other, a maximum value of (t1−t2) in the relationship of Q1−Q2>t1−t2 is calculated by the following expression.

Specifically, when the combination oil ring 1A has h12u or h12d, which falls within a range of from 0.3 [mm] to 0.6 [mm], and θu and θd, which fall within the range of from 5 [degrees] to 30 [degrees], and h12u and h12d are the same dimension and are equal to h12, $$t1 - t2 = (1 - \tan((90 - \theta u)/2)) \times h12u/2 - (1 - \tan((90 - \theta d)/2)) \times h12d/2 =$$
$$(1 - \tan((90 - 30)/2)) \times h12/2 - (1 - \tan((90 - 5)/2)) \times h12/2 =$$
$$0.169 \times h12.$$

From the expression described above,
when h12 is equal to 0.3 [mm], t1−t2=0.051, thus, Q≥0.055 [mm] is established,
when h12 is equal to 0.4 [mm], t1−t2=0.067, thus, Q≥0.070 [mm] is established,
when h12 is equal to 0.45 [mm], t1−t2=0.076, thus, Q≥0.080 [mm] is established,
when h12 is equal to 0.5 [mm], t1−t2=0.084, thus, Q≥0.09 [mm] is established, and
when h12 is equal to 0.6 [mm], t1−t2=0.101, thus, Q≥0.105 [mm] is established.

When the combination oil ring 1A has h12u or h12d, which falls within the range of from 0.3 [mm] to 0.40 [mm], and h12u and h12d are different dimensions, (t1−t2) is calculated by the following expression.

$$t1 - t2 = (1 - \tan((90 - \theta u)/2)) \times h12u/2 - (1 - \tan((90 - \theta d)/2)) \times h12d/2 =$$
$$(1 - \tan((90 - 30)/2)) \times 0.40/2 - (1 - \tan((90 - 5)/2)) \times 0.3/2 = 0.072$$

In this case, Q≥0.075 [mm] is satisfied.

Further, when the combination oil ring 1A has h12u or h12d, which falls within the range of from 0.3 [mm] to 0.45 [mm], and h12u and h12d are different dimensions, (t1−t2) is calculated by the following expression.

$$t1 - t2 = (1 - \tan((90 - \theta u)/2)) \times h12u/2 - (1 - \tan((90 - \theta d)/2)) \times h12d/2 =$$
$$(1 - \tan((90 - 30)/2)) \times 0.45/2 - (1 - \tan((90 - 5)/2)) \times 0.3/2 = 0.083$$

In this case, Q≥0.085 [mm] is satisfied.

Further, when the combination oil ring 1A has h12u or h12d, which is larger than 0.45 [mm] and equal to or smaller than 0.60 [mm], and h12u and h12d are different dimensions, (t1−t2) is calculated by the following expression.

$$t1 - t2 = (1 - \tan((90 - \theta u)/2)) \times h12u/2 - (1 - \tan((90 - \theta d)/2)) \times h12d/2 =$$
$$(1 - \tan((90 - 30)/2)) \times 0.60/2 - (1 - \tan((90 - 5)/2)) \times 0.45/2 = 0.108$$

In this case, Q≥0.110 [mm] is satisfied.

When the combination oil ring 1A has h12u or h12d, which is larger than 0.50 [mm] and is equal to or smaller than 0.60 [mm], and h12u and h12d are different dimensions, (t1−t2) is calculated by the following expression.

$$t1 - t2 = (1 - \tan((90 - \theta u)/2)) \times h12u/2 - (1 - \tan((90 - \theta d)/2)) \times h12d/2 =$$
$$(1 - \tan((90 - 30)/2)) \times 0.60/2 - (1 - \tan((90 - 5)/2)) \times 0.50/2 = 0.106$$

In this case, Q≥0.110 [mm] is satisfied.

Based on the calculations described above, it is preferred that the following expressions be satisfied in the combination oil ring 1A.

When h12u or h12d falls within the range of from 0.3 [mm] to 0.45 [mm], $$0.085 \text{ [mm]} \leq Q \leq 0.18 \text{ [mm]} \quad (10)$$

is satisfied.

When h12u or h12d is larger than 0.45 [mm] and equal to or smaller than 0.60 [mm], $$0.110 \text{ [mm]} \leq Q \leq 0.23 \text{ [mm]} \quad (11)$$

is satisfied.

The upper apparent protrusion amount Q1 is the difference between the thickness a1u of the upper segment 2 and the upper spacer thickness a8u, the lower apparent protrusion amount Q2 is the difference between the thickness a1d of the lower segment 3 and the lower spacer thickness a8d, and Q is the difference (Q1−Q2) between the upper apparent protrusion amount Q1 and the lower apparent protrusion amount Q2.

(Description of Functions of First Embodiment)

The combination oil ring 1A according to the first embodiment has the configuration described above. Now, functions thereof are described with reference to FIG. 5(A) and FIG. 6(A).

(Description of Mounted State of Combination Oil Ring 1A in Oil Ring Groove 51)

FIG. 5(A) is a schematic sectional view for illustrating a state in which the combination oil ring 1A is mounted in an oil ring groove 51 of a piston 50.

The state illustrated in FIG. 5(A) corresponds to a free state that is substantially similar to the free state illustrated in FIG. 1(A). In FIG. 5(A), a side clearance Sf for the combination nominal width h1 under the free state is illustrated. Under the free state illustrated in FIG. 5(A), the upper surface 22 of the upper segment 2 is held in close contact with an oil ring groove upper surface 52, whereas the lower surface 33 of the lower segment 3 is held in close contact with an oil ring groove lower surface 53. An inner peripheral-side end surface 48 of the expander spacer 4 is opposed to an oil ring groove inner peripheral surface 54, and the inner peripheral-side end surface 48 and the oil ring groove inner peripheral surface 54 are approximately parallel to each other. In the piston 50, an oil return port 55 is formed in the oil ring groove inner peripheral surface 54 to extend in the X direction. A position of the oil return port 55 is not limited thereto, and the oil return port 55 is formed in the oil ring groove lower surface 53 in some cases.

Under the free state illustrated in FIG. 5(A), the side clearance Sf under the free state is formed between the lower surface 23 of the upper segment 2 and the upper support upper surface 450 of the expander spacer 4. The side clearance Sf under the free state is equal to a difference (h1−h) between the sum h of the dimension h11u of the upper segment 2, the dimension h11d of the lower segment 3, and the expander spacer width (maximum width in the axial direction) h13, which are actually measured, and the combination nominal width h1. In this case, h1 and h have a relationship of (h1>h). The side clearance Sf under the free state is expressed by Expression (13).

$$Sf = h1 - h = h1 - (h11u + h11d + h13) \quad (13)$$

Further, under the free state illustrated in FIG. 5(A), the upper protrusion amount P1 of the upper segment 2 and the lower protrusion amount P2 of the lower segment 3 have the difference P=P1−P2. The upper-lower protrusion amount difference P under the free state illustrated in FIG. 5(A) is equal to the upper-lower protrusion amount difference P under the free state illustrated in FIG. 1(A).

Figure 11:
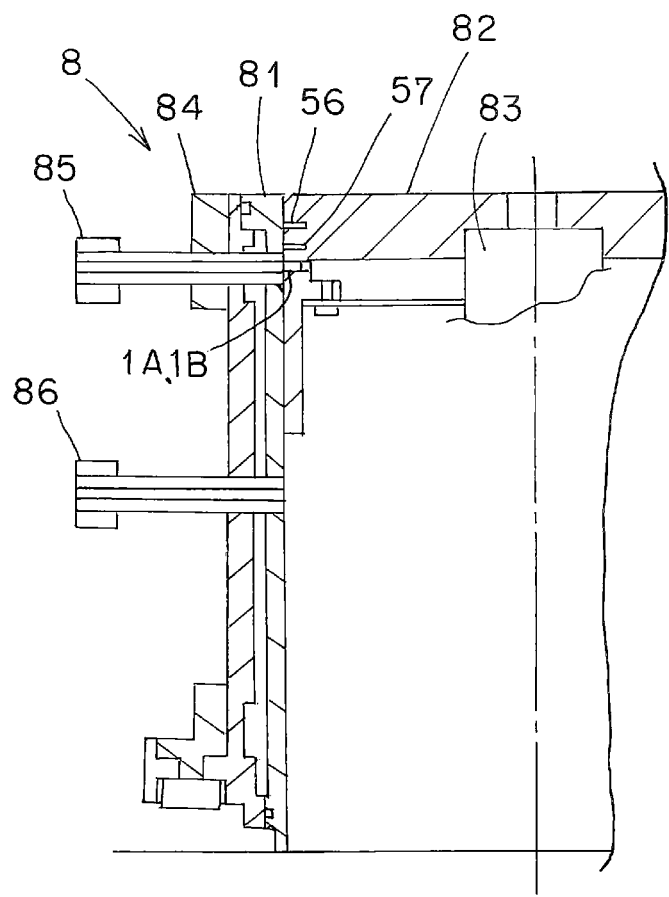
FIG. 11 is a partial schematic sectional view for illustrating an oil-film thickness measurement device.

Further, besides the combination oil ring 1A, a top ring 56 and a second ring 57 are mounted to the piston 50 (see FIG. 11 to FIG. 13).

(Description of Mounted State of Combination Oil Ring 1A Inside Cylinder Bore 60)

FIG. 6(A) is a schematic sectional view for illustrating a state in which the combination oil ring 1A is mounted in the oil ring groove 51 of the piston 50, and the combination oil ring 1A and the piston 50 are mounted inside a cylinder bore 60 (hereinafter referred to as "closed state").

The cylinder bore 60 having a cylindrical shape (including a substantially cylindrical shape) is formed in a cylinder block 6. The combination oil ring 1A and the piston 50 reciprocate in the Y direction inside the cylinder bore 60. During the reciprocation, the outer peripheral surface 20 of the upper segment 2 and the outer peripheral surface 30 of the lower segment 3 of the combination oil ring 1A, an outer peripheral surface of the top ring 56, and an outer peripheral surface of the second ring 57 slide against an inner wall surface 61 (hereinafter referred to simply as "bore wall surface 61") of the cylinder bore 60 under a state in which the above-mentioned outer peripheral surfaces are held in pressure contact with the bore wall surface 61. In other words, under a state in which the combination oil ring 1A is inserted in the cylinder bore 60, on the cross section of the combination oil ring 1A, which is taken along the axial direction of the cylinder, a center axis of the expander spacer 4 is rotated and inclined upward at a predetermined angle (angle α in FIG. 6(A)) over an entire circumference in the circumferential direction. The inclined surface of the upper ear portion of the expander spacer 4 is held in contact with the inner peripheral surface of the upper segment 2, and the inclined surface of the lower ear portion of the expander spacer 4 is held in contact with the inner peripheral surface of the lower segment 3. At the same time, an upper surface of an inner peripheral surface-side part of the upper segment 2 is held in pressure contact with the oil ring groove upper surface 52 over the entire circumference of the upper segment 2, and a lower surface of an inner peripheral surface-side part of the lower segment 3 is held in pressure contact with the oil ring groove lower surface 53 over the entire circumference of the lower segment 3. The outer peripheral surface vertex of the upper segment 2 and the outer peripheral surface vertex of the lower segment 3 are held in pressure contact with the bore wall surface over the entire circumferences of the segments, respectively.

In FIG. 6(A), a width of the oil ring groove 51 of the piston 50 in the Y direction is set as the combination nominal width h1 [mm] of the combination oil ring 1A. Further, a diameter of the bore wall surface 61 of the cylinder block 6 is set as a nominal diameter d1 [mm] of the combination oil ring.

The combination oil ring 1A in the closed state of FIG. 6(A) is in a state in which external forces (protruding forces) 2F1 (F1u and F1d) act on the bore wall surface 61 and an external force (side sealing force) F2 (F2u, F2d) acts on each of the oil ring groove upper surface 52 and the oil ring groove lower surface 53.

In the engine, the protruding forces 2F1 (F1u and F1d) acting on the bore wall surface 61 are associated with control of an oil film thickness on the bore wall surface 61 and increase and decrease in friction or followability of the combination oil ring 1A to the bore wall surface 61, and the like. The side sealing force F2 (F2u, F2d) acting on each of the oil ring groove upper surface 52 and the oil ring groove lower surface 53 is associated with adhesion between the combination oil ring 1A and the oil ring groove upper surface 52 and between the combination oil ring 1A and the oil ring groove lower surface 53, control of a flow passage for an engine lubricating oil, and the like.

In the combination oil ring 1A, the nominal width h12u of the upper segment and the nominal width h12d of the lower segment are equal to each other, and the thickness dimension a1u of the upper segment 2 is larger than the thickness dimension a1d of the lower segment 3. When the combination oil ring 1A is in the free state, the upper year angle θu and the lower year angle θd of the expander spacer 4 are equal to each other, a8u=a8d is established, and the upper apparent protrusion amount Q1=(a1u−a8u) is larger than the lower apparent protrusion amount Q2=(a1d−a8d). Therefore, the combination oil ring 1A has Q=a1u−a1d as the upper-lower apparent protrusion amount difference.

As a result, when the combination oil ring 1A is in the closed state, a bending moment M is generated in the expander spacer 4 as an internal force due to the upper-lower apparent protrusion amount difference Q. The center axis CL of the expander spacer 4 is rotated and inclined upward about a center G by the angle α [degrees] toward the outer peripheral side in the X direction without being constrained (without interference).

In this case, the rotation and the inclination of the expander spacer 4 by the angle α [degrees] are exactly equivalent to a decrease in free-state side clearance Sf. Specifically, a distance between the lower surface 23 of the upper segment 2 and the upper surface 32 of the lower segment 3 is increased. Therefore, a gap in the axial direction between the upper segment 2 and the oil ring groove upper surface 52 or a gap in the axial direction between the lower segment 3 and the oil ring groove lower surface 53 is reduced. In particular, during an engine down stroke, an engine oil can be prevented from flowing to the upper side (cylinder head side) from the gap between the upper segment 2 and the oil ring groove upper surface 52 so as to reduce oil consumption.

Accordingly, the upper year angle θu [degrees] formed under the free state is increased by the angle α [degrees] and acts under the thus increased state when the combination oil ring 1A is in the closed state. Therefore, the side sealing force F2u acting on the upper segment 2 for sealing to the oil ring groove upper surface 52 is increased by F1(tan(θu+α)−tan θu). In this manner, a sealing force between the upper segment 2 and the oil ring groove upper surface 52 is increased to improve sealing performance. Further, the lower year angle θd that is formed under the free state is reduced by the angle α [degrees] and acts under the thus reduced state when the combination oil ring 1A is in the closed state. Therefore, the side sealing force F2d acting on the lower segment 3 for sealing to the oil ring groove lower surface 53 is reduced by F1(tan θu−tan(θu−α)). In this manner, a frictional force between the lower segment 3 and the oil ring groove lower surface 53 is reduced to improve a protruding property toward the bore wall surface 61. Thus, the oil film thickness is controlled to be small. As described above, the combination oil ring 1A can reduce the oil consumption.

(Description of Comparative Examination Between Example and Comparative Example)

The combination oil ring 1A according to the first embodiment (hereinafter referred to as "Example 1A") and the combination oil ring 1B of a comparative example (hereinafter referred to as "Comparative Example 1B") are now compared and examined in terms of the improvement in sealing performance and the reduction in oil consumption.

(Description of Comparative Example 1B)

Comparative Example 1B is now described with reference to FIG. 1(B), FIG. 2(B), FIG. 5(B), and FIG. 6(B). The lower segment 3 and the expander spacer 4 of Comparative Example 1B are the same as the lower segment 3 and the expander spacer 4 of Example 1A. The thickness dimension a1u of an upper segment 2B of Comparative Example 1B is smaller than the thickness dimension a1u of the upper segment 2 of Example 1A by P [mm], which is indicated by the outer peripheral surface vertex 24 in the broken line in FIG. 2(B). The upper segment 2B of Comparative Example 1B has a joint (not shown) as in the case of the upper segment 2 of Example 1A.

Specifically, the thickness dimension a1u of the upper segment 2B of Comparative Example 1B and the thickness dimension a1d of the lower segment 3 of Comparative Example 1B are equal to each other (a1u=a1d). Therefore, as illustrated in FIG. 1(B), under the free state, the upper protrusion amount P1 of the upper segment 2B and the lower protrusion amount P2 of the lower segment 3 are equal to each other (P1=P2). Hence, there is no upper-lower protrusion amount difference P (P=0). In FIG. 1(B), a combination thickness a11 is illustrated. The upper combination thickness a11u and the lower combination thickness a11d are equal to each other (a11u=a11d=a11).

Figure 5B:
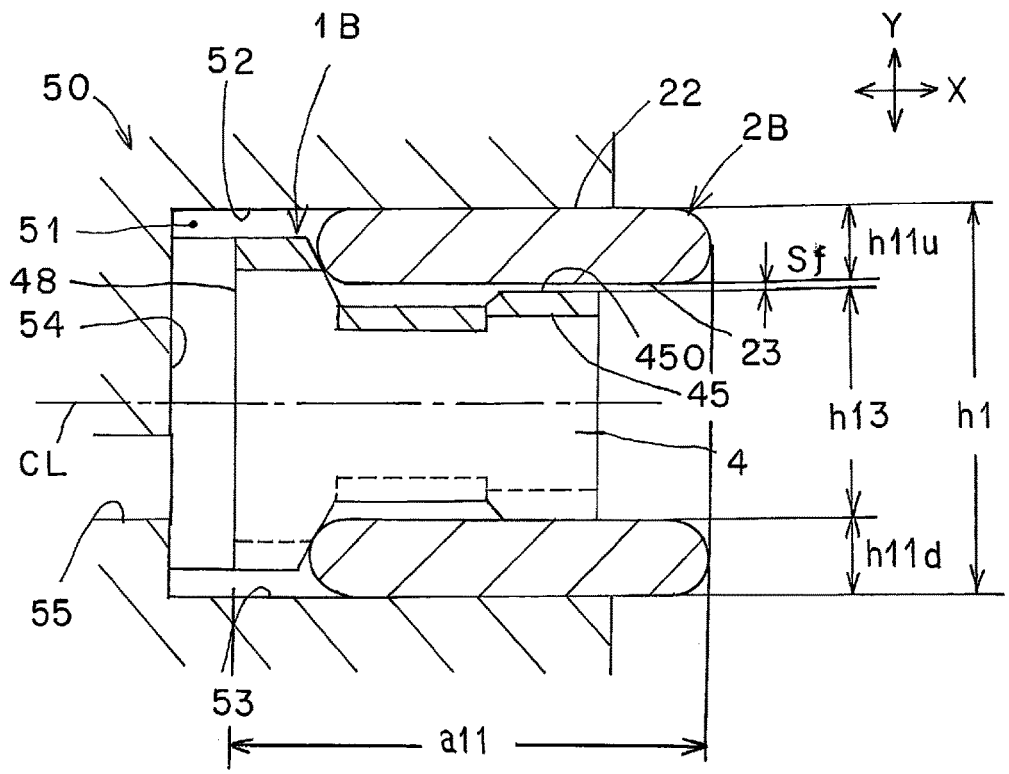
FIG. 5(B) is a schematic sectional view of the combination oil ring of the comparative example, in which the combination oil ring is mounted in an oil ring groove of a piston.
Figure 6B:
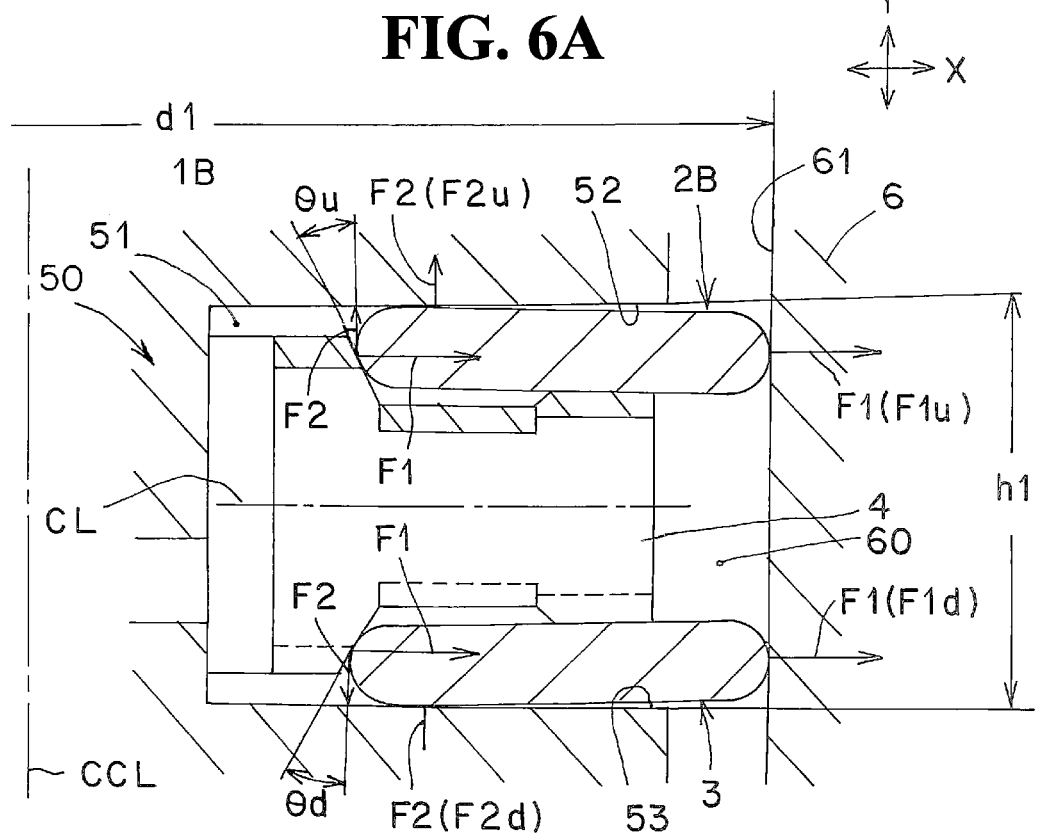
FIG. 6(B) is a schematic sectional view of the combination oil ring of the comparative example in the closed state, in which the combination oil ring is inserted in a cylinder bore.

As described above, Comparative Example 1B has an entirely vertically symmetric shape with respect to the center axis CL under the free state of FIG. 1(B), under the piston-mounted state of FIG. 5(B), and under the closed state of FIG. 6(B). Therefore, in the expander spacer 4 of Comparative Example 1B, the bending moment M, which is generated in the expander spacer 4 of Example 1A, is not generated under the closed state. As a result, Example 1A and Comparative Example 1B differ in terms of the improvement in sealing performance and the reduction in oil consumption. Details thereof are described below.

(Description of Tangential Tensions of Example 1A and Comparative Example 1B)

A tangential tension of Example 1A and a tangential tension of Comparative Example 1B are now described with reference to FIG. 7 to FIG. 9.

Figure 7:
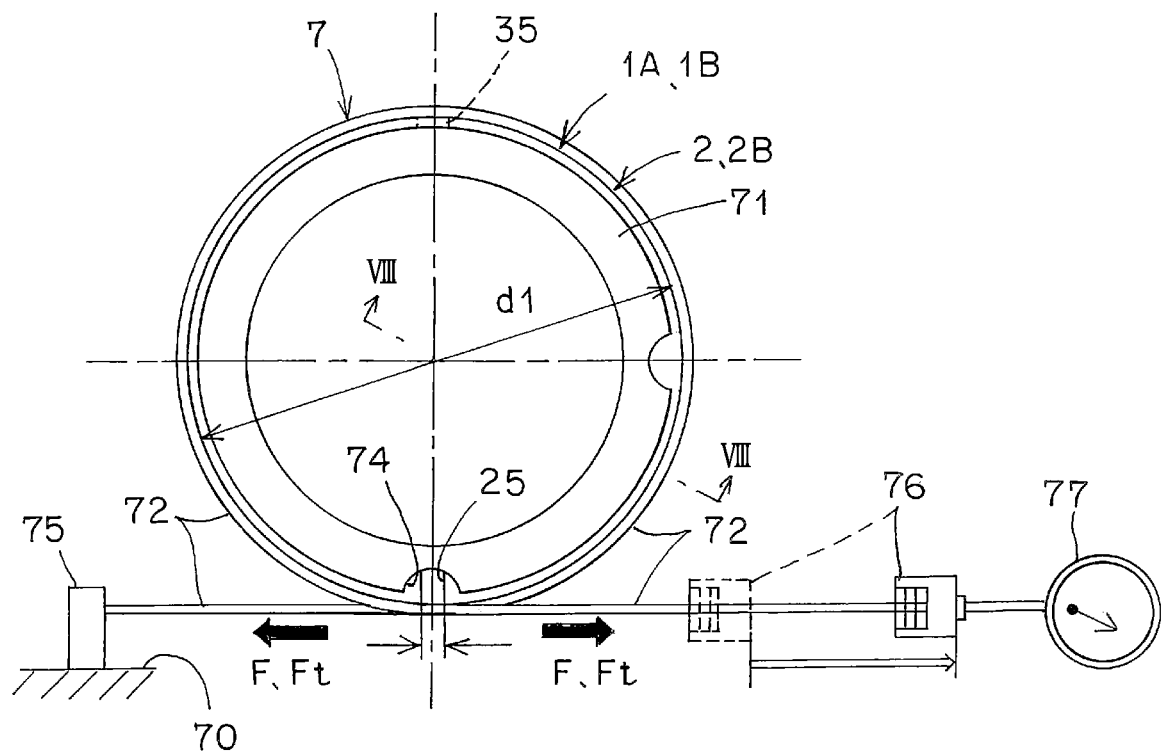
FIG. 7 is a schematic plan view for illustrating a tangential tension measurement device for the combination oil ring.
Figure 8:
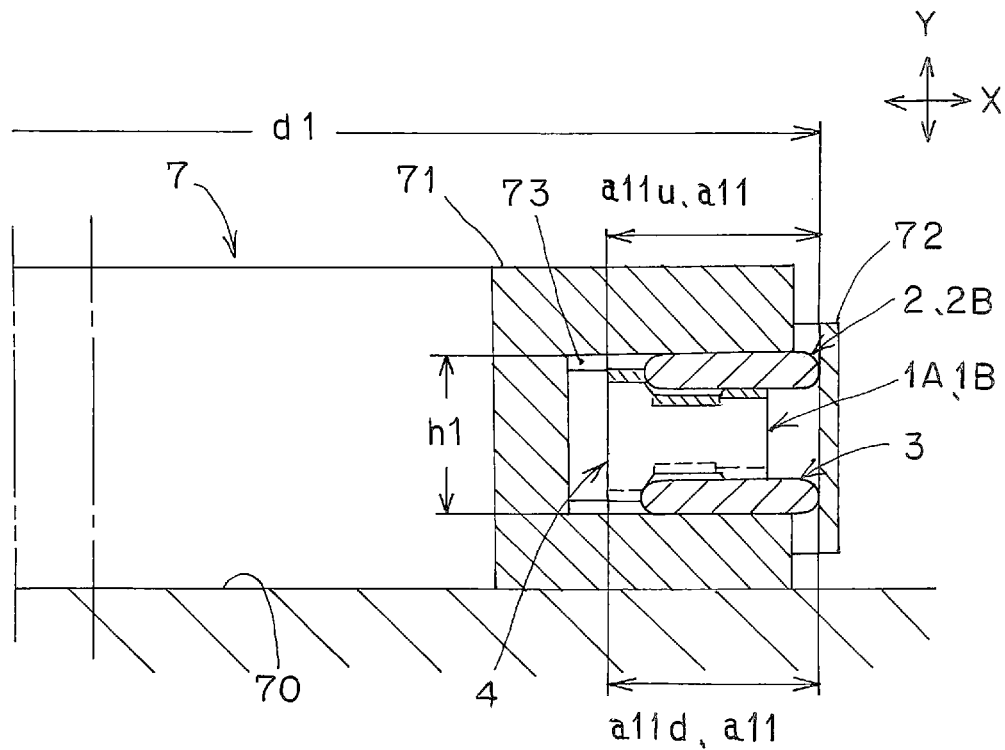
FIG. 8 is a partial schematic sectional view (schematic sectional view taken along the line Z-Z of FIG. 7) for illustrating the tangential tension measurement device for the combination oil ring.
Figure 9A:
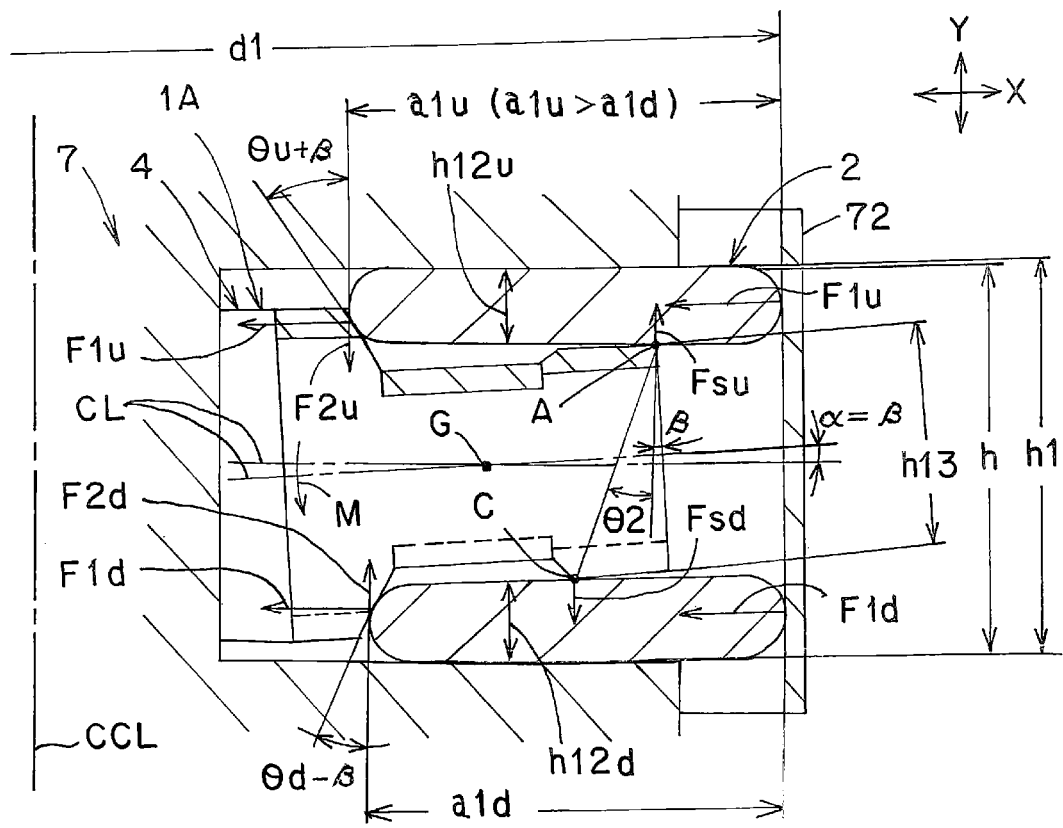
FIG. 9(A) is a schematic sectional views for illustrating the combination oil ring in a measurement state in the tangential tension measurement device of FIG. 7 and FIG. 8, that is, the schematic sectional view of the combination oil ring according to the first embodiment (a1u>a1d) of the present invention.
Figure 9B:
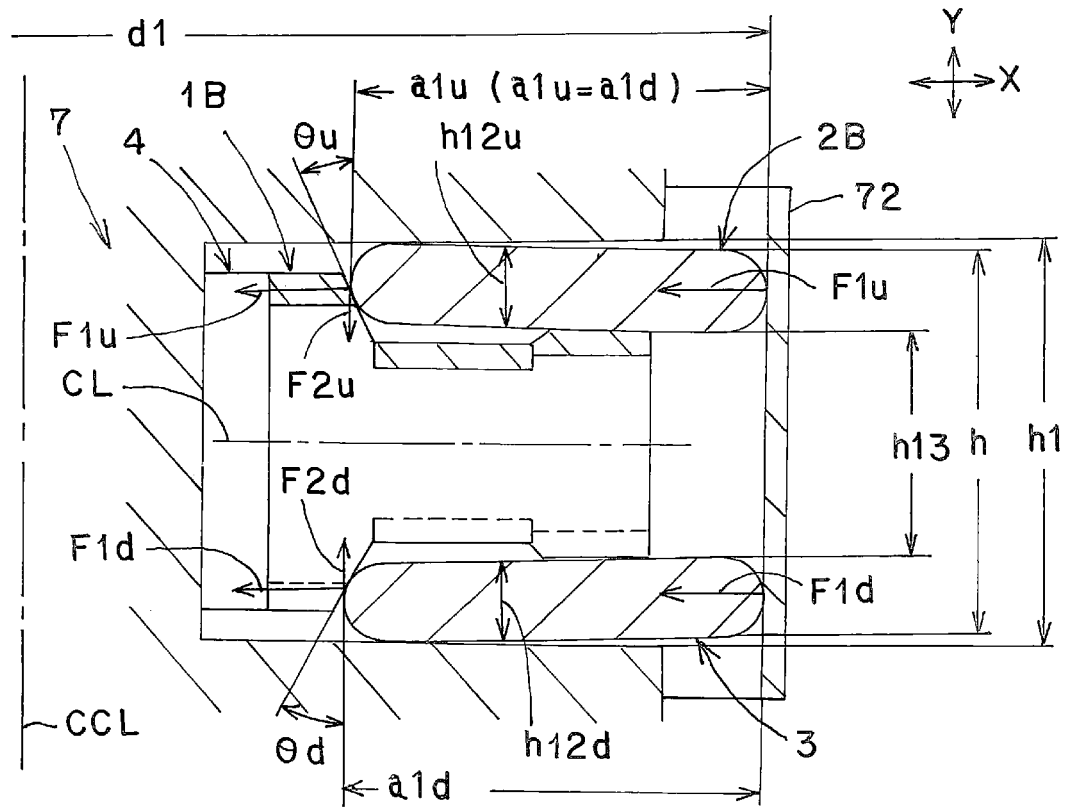
FIG. 9(B) is a schematic sectional view of the combination oil ring of the comparative example, which is in the measurement state.

FIG. 7 is a schematic plan view for illustrating a measurement device for a tangential tension (hereinafter referred to as "tension") F [N] of Example 1A and a tension Ft [N] of Comparative Example 1B, each with the nominal diameter d1 of the combination oil ring. A measurement method conforms to JIS B8032-2:2016 (ISO 6621-2:2003). FIG. 8 is a partial schematic sectional view (schematic sectional view taken along the line Z-Z of FIG. 7) for illustrating a tangential tension measurement device for a combination oil ring. FIG. 9(A) and FIG. 9(B) are schematic sectional views each for illustrating a measurement state of the combination oil ring in the tangential tension measurement device of FIG. 7 and FIG. 8. FIG. 9(A) is a schematic sectional view of the measurement state of Example 1A, and FIG. 9(B) is a schematic sectional view of the measurement state of Comparative Example 1B.

A tangential tension measurement device 7 includes a horizontal measurement table 70, a measurement holder 71, and a metal tape 72. The measurement holder 71 is installed on the measurement table 70. A recessed groove 73, which serves as a substitute for the oil ring groove 51, is formed in an annular shape in an outer peripheral surface of the measurement holder 71. The recessed groove 73 is formed to have a width equal to the combination nominal width h1 [mm] and to have dimensions that do not interfere with the upper combination thickness a11u, the lower combination thickness a11d, and the combination thickness a11 [mm].

A cutout portion 74 is processed on the measurement holder 71. The cutout portion 74 enables, under the measurement state in the tangential tension measurement device 7, actual measurement of a width (distance between two solid lines with arrows, which are oriented to face each other in FIG. 7) of the joint 25 of each of the upper segments 2 and 2B with the nominal diameter d1 of the combination oil ring of each of Example 1A and Comparative Example 1B, specifically, under the closed state. When another cut out portion (shown) is formed, the combination width under the closed state can be actually measured.

The metal tape 72 is placed on the measurement table 70. The metal tape 72 has one end, which is used as a fixed end 75, and another end (free end), which is fixed to a movable gripper 76. For the gripper 76, "zero point adjustment (reference position adjustment)" to a predetermined position corresponding to the nominal diameter d1 [mm] of the combination oil ring is performed by a dial gauge 77 in advance.

Example 1A, Comparative Example 1B is mounted in the recessed groove 73 of the measurement holder 71. Thereafter, the joint 25 of the upper segment 2, 2B is arranged at a position of the cutout portion 74 of the measurement holder 71, whereas the joint 35 of the lower segment 3 is arranged at a position 180 [degrees] opposite to the position of the cutout portion 74. The measurement holder 71 into which Example 1A, Comparative Example 1B is mounted is placed inside the metal tape 72 having the annular shape. The gripper 76, which grips the free end side of the metal tape 72, is moved from a position indicated by the broken line to a position indicated by the solid line (predetermined position) in a direction indicated with the outlined arrow. As a result, a diameter of Example 1A, Comparative Example 1B is reduced by the metal tape 72.

During the reduction in diameter, vibration is applied to the measurement holder 71 in the Y direction of Example 1A, Comparative Example 1B so as to eliminate friction at the periphery of Example 1A, Comparative Example 1B. Then, the tension F [N], Ft [N] (see the thick solid lines with arrows in FIG. 7) is measured. In the following force equilibrium relationships, it is assumed that a frictional force between the upper segment 2, 2B and the upper surface of the recessed groove 73 and a frictional force between the lower segment 3 and the lower surface of the recessed groove 73 are "zero" and therefore do not act on Example 1A, Comparative Example 1B as an external force.

The tension F [N] of Example 1A and the tension Ft [N] of Comparative Example 1B are generated by contraction of the expander spacer 4 in the circumferential direction (action equivalent to deflection of a compression coil spring) when the diameter of Example 1A, Comparative Example 1B is reduced to the nominal diameter d1. In FIG. 9(A) and FIG. 9(B), there are illustrated the external forces F1u and F1d exerted by the metal tape 72 on Example 1A, Comparative Example 1B during the measurement of the tension F [N], Ft [N] in FIG. 7.

(Description of Tangential Tension of Comparative Example 1B)

The tangential tension of Comparative Example 1B is now described with reference to FIG. 9(B). The external forces F1u and F1d exerted by the metal tape 72 act on the upper ear portion 43 and the lower ear portion 44 of the expander spacer 4 in the X direction as the external forces F1u and F1d, respectively, and also act downward and upward in the Y direction with the functions of the upper ear angle θu [degrees] and the lower ear angle θd [degrees] as external forces (component forces) F2u and F2d, respectively. The component forces are expressed as: $F2u=F1u\times\tan\theta u$ and $F2d=F1d\times\tan\theta d$.

The forces are balanced under the state illustrated in FIG. 9(B). Now, a relationship with the tension Ft [N] is considered. Specifically, the tension Ft [N] is replaced with the force synthesized over the entire circumference of the contact surface pressure of Comparative Example 1B (expressed by $2Ft/((h12u+h12d)\times d1)$ [N]/[mm²]). Then, $F1u=F1d=\pi Ft$ [N] is established, where π is the ratio of the circumference. When a condition of $\theta u=\theta d=\theta$ [degrees] is satisfied, $F2u=F2d=\pi Ft\times\tan\theta$ [N] is established.

(Description of Closed State of Comparative Example 1B)

FIG. 6(B) is an illustration of the external forces F1 (F1u, F1d) and F2 (F2u, F2d) exerted by Comparative Example 1B under the closed state similar to the tangential tension measurement state of FIG. 9(B). A width of the oil ring groove 51 in the Y direction is set to the combination nominal width h1 [mm] of the combination oil ring. The diameter of the bore wall surface 61 of the cylinder block 6 is set to the nominal diameter d1 [mm] of the combination oil ring. Comparative Example 1B is entirely symmetric with respect to the center axis CL. Specifically, for the upper segment 2B and the lower segment 3, conditions of h12u=h12d and a1u=a1d are satisfied. For the expander spacer 4, a condition of θu=θd=8 [degrees] is satisfied. Remaining positional dimensions on the upper side and on the lower side are the same.

Therefore, when conditions of $F1u=F1d=F1=\pi Ft$ and $F2u=F2d=F2=\pi Ft\times\tan\theta$ are satisfied, the forces are balanced even under the closed state of FIG. 6(B) as under the tangential tension measurement state of FIG. 9(B). Specifically, in Comparative Example 1B, the external force (protruding force) $2F1=2\pi Ft$ acts toward the bore wall surface 61, and the external force (side sealing force) $F2=\pi Ft\times\tan\theta$ acts toward each of the oil ring groove upper surface 52 and the oil ring groove lower surface 53.

In an engine, the protruding force $2F1=2\pi Ft$ toward the bore wall surface 61 relates with the control of the oil film thickness on the bore wall surface 61, the increase and decrease in friction, the followability of Comparative Example 1B to the bore wall surface 61, and the like. Further, the side sealing forces $F2=\pi Ft\times\tan\theta$ acting on each of the oil ring groove upper surface 52 and the oil ring groove lower surface 53 relate with adhesion property between Comparative Example 1B and the oil ring groove upper surface 52 and the oil ring groove lower surface 53, the flow passage control for the engine lubricating oil, and the like.

(Description of Tangential Tension of Example 1A)

Now, the tangential tension of Example 1A is described with reference to FIG. 9(A). FIG. 9(A) is an illustration of the external forces F1u and F1d exerted on Example 1A by the metal tape 72 when the tension F [N] of Example 1A is measured after transition from the free state of FIG. 5(A).

Based on the difference (a1u−a1d) in thickness between the upper segment 2 and the lower segment 3 and the condition of a8u=a8d, which is satisfied for the upper spacer thickness a8u and the lower spacer thickness a8d of the expander spacer 4, under the free state illustrated in FIG. 1(A) and FIG. 5(A), Example 1A has the difference Q=Q1−Q2 between the upper apparent protrusion amount Q1= (a1u−a8u) of the upper segment 2 and the lower apparent protrusion amount Q2=(a1d−a8d) of the lower segment 3.

Therefore, under the tangential tension measurement state of FIG. 9(A), when the diameter of Example 1A is reduced with use of the metal tape 72, the bending moment M acts in the expander spacer 4 due to the upper-lower apparent protrusion amount difference Q as under the closed state of FIG. 6(A). As a result, the center axis CL of the expander spacer 4 is rotated and inclined upward about the center G by an angle β [degrees] toward the outer peripheral side in the X direction without being constrained (without interference). The state in which the expander spacer 4 is freely rotated by the angle β [degrees] without being constrained during the reduction in diameter of Example 1A under the tangential tension measurement state of FIG. 9(A) is the same as the state in which the expander spacer 4 is inclined upward at the angle α [degrees] toward the outer peripheral side in the X direction under the closed state of FIG. 6(A). As a result, in FIG. 9(A), a relationship of α=β is established.

When a sum of h12u/2, h12d/2, and h13 is R, the angle β can be calculated as an angle that allows a tangent to be obtained by: Q/R=((a1u−a8u)−(a1d−a8d))/(h12u/2+h12d/2+h13)=(a1u−a1d)/(h12 u/2+h12d/2+h13).

Now, it is assumed that the center axis CL of the expander spacer 4 is rotated about the center G without being constrained (without interference). In this case, based on the expression described above, as shown in FIG. 10 which has the horizontal axis representing the expander spacer width h13 and the vertical axis representing the expander spacer inclination angle β [degrees], the angle β can be read by an estimation with the value of the upper-lower apparent protrusion amount difference Q under the free state. Details thereof are described later.

Under the tangential tension measurement state of FIG. 9(A), a side clearance Sc (not shown) under the closed state is "zero" and, due to the bending moment M, the expander spacer 4 is held in contact with the upper segment 2 at the position A (the outer peripheral-side end portion of the upper support upper surface) and with the lower segment 3 at the position C (the inner peripheral-side end portion of the lower support lower surface) in FIG. 9(A), which are illustrated in FIG. 9(A). Under the tangential tension measurement state, a force (upper side sealing force) Fsu for pressing the upper segment 2 upward is generated at the position A, and a force (lower side sealing force) Fsd for pressing the lower segment 3 downward acts at the position C as a reaction force of Fsu (Fsd=Fsu).

Based on the equilibrium of forces, Fsu=F2u and Fsd=F2d are established.

At this time, when an acute angle formed between the line segment AC and the Y direction is θ2, L cos θ2=h13+Sf is established. When side clearance under the closed-state is Sc (not shown) on the condition that a condition of θ1−β≥θ2 is satisfied and the length L of the line segment AC satisfies a condition of L≥h13+Sf=h1−(h11u+h11d), Sc is expressed as: Sc=L cos θ2−L cos (θ1−β).

Further, Sc=h13+Sf−L cos (θ1−β)=Sf+L cos θ1−L cos (θ1−β) is established. Based on the relationship of θ1>θ1−β, Sc<Sf is established in the structure of the combination oil ring. When the center axis CL of the expander spacer 4 is rotated and inclined upward about the center G toward the outer peripheral side in the X direction without being constrained (without interference), β can be substituted for α in the expression described above.

Under the tangential tension measurement state of FIG. 9(A), even when the expander spacer 4 is rotated due to the bending moment M generated as a result of the exertion of the external forces, the expander spacer 4 is not brought into contact with the upper segment 2 at the position A and with the lower segment 3 at the position C in FIG. 9(A) in some cases. In this case, no force acts on the upper segment 2 at the position A and on the lower segment 3 at the position C. Specifically, when the length L of the line segment AC satisfies a condition of L<h13+Sf, the expander spacer 4 is not brought into contact with the upper segment 2 or the lower segment 3. In this case, the oil ring groove upper surface 52 of the piston 50 and the inner peripheral part of the upper surface 22 of the upper segment 2 are held in contact with each other, and the oil ring groove lower surface 53 and the inner peripheral part of the lower surface 33 of the lower segment 3 are held in contact with each other. Further, the outer peripheral surface 20 of the upper segment 2 and the outer peripheral surface 30 of the lower segment 3 slide on the bore wall surface 61 under a state in which the outer peripheral surface 20 and the outer peripheral surface 30 are held in contact with the bore wall surface 61.

Even in this case, however, as long as the expander spacer 4 is inclined by the angle α in the axial direction with respect to the center axis CL, the free-state side clearance Sf, which is expressed as: Sf=h1−h=h1−h11u−h11d−h13=h1−h11u−h11d−L cos θ1, and the closed-state side clearance Sc, which is expressed as: Sc=h1−h11u−h11d−L cos(θ1−α), have a relationship of L cos θ1<L cos(θ1−α) in comparison therebetween. Therefore, Sc<Sf is established.

Figure 19:
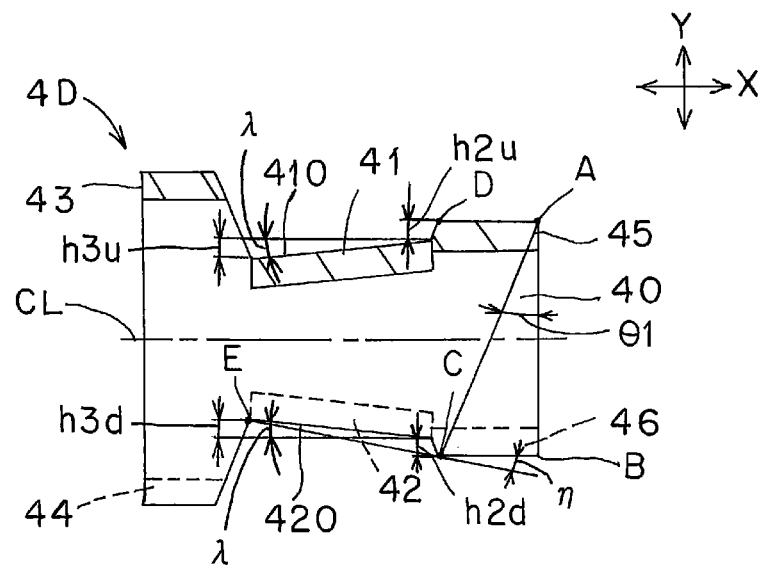
FIG. 19 is a schematic sectional view for illustrating a first modification example of the expander spacer included in the combination oil ring according to the present invention.
Figure 20:
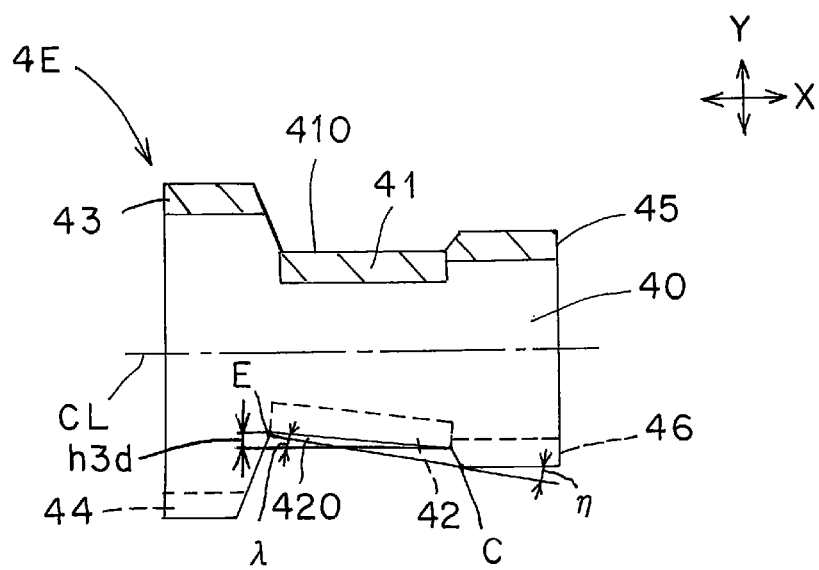
FIG. 20 is a schematic sectional view for illustrating a second modification example of the expander spacer included in the combination oil ring according to the present invention.

When the angle η (see FIG. 2(A), FIG. 19, and FIG. 20) formed between the line segment CE and the center axis CL is under a condition of β≤η, the angle α under the closed state of FIG. 6(A) is equal to the angle β under the tangential tension measurement state of FIG. 9(A). Specifically, under the closed state, the expander spacer 4 of Example 1A is rotated by the angle β about the center G under the action of the bending moment M. Without interference with other portions, the center axis CL is inclined upward at the angle α [degrees] toward the outer peripheral side in the radial direction. In order to achieve the above-mentioned structure, the angle η formed between the line segment CE and the center axis CL is required to satisfy a condition of η≥β.

Further, for a normal behavior of Example 1A, the lower ear angle θd is required to be equal to or larger than "zero" under the closed state, specifically, θd−β≥0 is a requirement to be satisfied. Further, in order to increase the sealing force between the upper segment 2 and the oil ring groove upper surface 52, it is preferred that the upper ear angle θu and the lower ear angle θd satisfy a relationship of θu+β≥θd−β. Meanwhile, it is preferred to also satisfy a condition of θu+β≤45 [degrees]. When θu≤β exceeds 45 [degrees], a frictional force between the upper segment 2 and the oil ring groove upper surface 52 becomes excessive. As a result, the followability of the upper segment 2 to the bore wall surface 61 is degraded to reduce an oil scraping function.

The external forces F1u and F1d generated by the metal tape 72 are exerted on the upper ear portion 43 and the lower ear portion 44 of the expander spacer 4 in the X direction as the external forces F1u and F1d, respectively. In addition, the external forces F1u and F1d act upward and downward in the Y direction as the external forces (component forces) F2u and F2d due to the upper ear angle θu and the lower ear angle θd, respectively. The component forces are expressed as: F2u=F1u×tan (θu+β) and F2d=F1d×tan (θd−β).

An equilibrium of forces is attained under the state illustrated in FIG. 9(A). Now, a relationship with the tension F [N] is considered. Specifically, the tension F [N] is replaced with the force synthesized over the entire circumference of the contact surface pressure of 1A (expressed by 2F/((h12u+h12d)×d1) [N]/[mm²]). Then, a condition of F1u=F1d=πF [N] is satisfied, n is the ratio of the circumference, and when a condition of θu=θd=θ [degrees] is satisfied, F2u=F1u×tan(θ+β)=πF tan(θ+β) [N] and F2d=F1d×tan(θ−β)=πF tan(θ−β) [N] are established. Thus, F2u>F2d is established.

When conditions of Ft=F [N] and θu=θd=θ [degrees] are satisfied in Example 1A and Comparative Example 1B, the external forces F1u and F1d exerted by the metal tape 72 are the same for Example 1A and Comparative Example 1B. As for the external forces (component forces) F2u and F2d, which are further exerted upward and downward in the Y direction due to the upper ear angle θu [degrees] and the lower ear angle θd [degrees], the component force F2u in Example 1A is larger by πFt (tan (θ+β)−tan θ) [N] in comparison to that in Comparative Example 1B, and the component force F2d in Example 1A is smaller by πFt(tan θ−tan(θ−β)) [N] in comparison to that in Comparative Example 1B.

(Description of Bending Moment M)

Now, the bending moment M is considered. The dimensions of Example 1A of FIG. 9(A) are the same as those of Comparative Example 1B of FIG. 9(B) except for a1u>a1d described above. Regarding the thickness of the upper segment 2 in Example 1A under the tangential tension measurement state (closed state with the reduced diameter) of FIG. 9(A), the condition of (a1u=a1d) of Comparative Example 1B under the tangential tension measurement state (closed state with the reduced diameter) of FIG. 9(B) is substituted to the condition of (a1u>a1d).

Specifically, the above-mentioned substitution is equivalent to the exertion of the external force for deflecting the upper ear portion 43 of the expander spacer 4 by (a1u−a1d) [mm] in the X direction. Meanwhile, in Example 1A, the inner peripheral surface 21 of the upper segment 2 abuts against the upper ear inclined surface 430 of the expander spacer 4, and the inner peripheral surface 31 of the lower segment 3 abuts against the lower ear inclined surface 440 of the expander spacer 4. The abutting portion, namely, the inner peripheral surface 31 of the lower segment 3, serves as a fixed end of a rotation. When an external force W (not shown; corresponding to the external force F1u in FIG. 9(A)) from the outer peripheral surface 20 of the upper segment 2 acts on the upper year inclined surface 430 of the expander spacer 4, a deflection 5 (not shown) of the upper ear inclined surface 430 of the expander spacer 4 becomes δ=(a1u−a1d) [mm]. In other word, Example 1A corresponds to a structure model of a cantilever generating above mentioned bending moment M.

The external force W from the outer peripheral surface 20 of the upper segment 2 acts on the upper year inclined surface 430 of the expander spacer 4 to generate the bending moment M in the expander spacer 4. As a result, the expander spacer 4 is rotated. Based on the structure described above, the external force W acts on the inner peripheral surface 31 of the lower segment 3 as the reaction force W (not shown; corresponding to the external force F1 in FIG. 6(A)).

The external forces acting on the upper segment 2B and the lower segment 3 in Comparative Example 1B of FIG. 9(B) have a relationship of W=F1u=F1d=πFt. The thickness of the upper segment is (a1u=a1d) in the Comparative Example 1B of FIG. 9(B) under the closed state with the reduced diameter, however, the thickness of the upper segment is substituted to (a1u>a1d) in Example 1A of FIG. 9(A). And the external forces acting on the upper segment 2 and the lower segment 3 are set to satisfy the condition of W=F1u=F1d=πFt.

Meanwhile, based on the cantilever structure model, the following relationship is established. The external forces are set to have the relationship of W=F1u=πFt, a Young's modulus of the material of the expander spacer 4 is set to Ee [N/mm²], and a moment of inertia of area of the expander spacer 4 is set to Ie [mm⁴]. Then, the deflection of the upper ear inclined surface 430 of the expander spacer 4 is expressed by: 5=a1u−a1d=Q. Thus, $$W = 3EeIe\delta/(\text{length of arm of upper ear inclined surface and length of arm of lower ear inclined surface})^3 = 3EeIe \times (a1u-a1d)/(h13+h12u/2+h12d/2)^3$$

or $$W = 3EeIe\delta/(h13 + h11u/2 + h11d/2)^3$$
$$= 3EeIe \times (a1u - a1d)/(h13 + h11u/2 + h11d/2)^3.$$

In the expressions described above, EeIe is a characteristic value of the expander spacer 4 and is expressed as follows.

$$EeIe = \tfrac{1}{3} \times W \times (\text{length of arm of upper ear inclined surface and length of arm of lower ear inclined surface})^3/\delta = \tfrac{1}{3} \times W \times (h13+h12u/2+h12d/2)^3/(a1u-a1d).$$

In the expression described above, a condition of W=F1u=πFt is satisfied. The external force W is obtained by the measurement of the tension of the combination oil ring, and other elements can be calculated by measurement of the dimensions of the portions.

By the expression described above, EeIe is obtained. Specifically, even when the Young's modulus Ee of the material is unknown or a sectional shape of the cantilever structure is complex, EeIe can be calculated from the cantilever structure model in which the deflection of δ [mm] is caused by the external force W [N] obtained by the measurement of the tension of the combination oil ring.

The bending moment M acting in the expander spacer 4 is calculated as:

$$M = 3EeIe \times \delta/(h13 + h12u/2 + h12d/2)^2$$
$$= 3EeIe \times (a1u - a1d)/(h13 + h12u/2 + h12d/2)^2$$

or $$M = 3EeIe \times \delta/(h13 + h11u/2 + h11d/2)^2$$
$$= 3EeIe \times (a1u - a1d)/(h13 + h11u/2 + h11d/2)^3.$$

The thickness of the upper segment is (a1u=a1d) in the Comparative Example 1B of FIG. 9(B) under the closed state with the reduced diameter, however, the thickness of the upper segment is substituted to (a1u>a1d) in Example 1A of FIG. 9(A). As a result, the tension is increased. In the present invention, however, it is assumed that the tension is not increased and advantageous features of Example 1A over Comparative Example 1B have been found under the condition that the tension is the same.

(Calculation of Bending Moment Generated by Tangential Tension of Each of Example 1A and Comparative Example 1B Based on Specific Dimensional Numerical Values)

Now, the tangential tension of each of Example 1A and Comparative Example 1B based on specific dimensional numerical values is described.

The following dimensions are used. Specifically, the combination nominal width h1 is equal to 2.0 [mm]. Two standards are used for the upper segment thickness, specifically, a1u is equal to 2.02 [mm] and 1.87 [mm]. The lower segment thickness a1d is equal to 1.87 [mm]. The expander spacer width (maximum width in the axial direction) h13 is equal to 1.14 [mm]. The upper segment nominal width h12u and the lower segment nominal width h12d are equal to 0.4 [mm]. The upper segment width h11u is equal to 0.395 [mm]. The lower segment width h11d is equal to 0.395 [mm]. At this time, the tangential tension of Comparative Example 1B in a case in which a combination of the upper segment thickness a1u and the lower segment thickness a1d, each being equal to 1.87 [mm], is used is Ft [N], and the tangential tension of Example 1A in a case in which the same expander spacer 4 is used and a combination of the upper segment thickness a1u of 2.02 [mm] and the lower segment thickness a1d of 1.87 [mm] is used is F [N]. Then, Ft=21.8 [N] and F=27.6 [N] were obtained.

The dimensions of the portions of the expander spacer 4 are as follows. Specifically, a3d is equal to 0.65 [mm], h2d is equal to 0.08 [mm], h3d is equal to 0.06 [mm], a8d is equal to 1.55 [mm], the upper ear angle θu is equal to 15 [degrees], the lower ear angle θd is equal to 15 [degrees], θ1 is equal to 29.69 [degrees], θ2 is equal to 21.62 [degrees], η is equal to 8.8 [degrees], and L is equal to 1.312 [mm]. The inclination angle β of the expander spacer is 5.6 [degrees] and satisfies a condition of η>β. Therefore, β=α is established. The side clearance Sf under the free state is equal to 0.07 [mm], and the side clearance Sc under the closed state is equal to 0.012 [mm]. When a width of the oil ring groove of the piston 82 is Hp and Hp is larger than the combination nominal width h1 of the combination oil ring, the side clearance under the closed state which is a state in combination with the piston is expressed as: Sc+(Hp−h1).

When the upper segment thickness a1u is substituted from 1.87 [mm] to 2.02 [mm], the external force W additionally applied to Example 1A is obtained as, based on F−Ft=W/π=5.8 [N], W=5.8×π=18.2 [N].

Further, the following values of the expander spacer 4 that are actually measured are obtained. The tangential tension of Example 1A when being in combination is obtained as: F=27.6 [N]. The force exerted as the external force is obtained as: W=ηF=86.7 [N]. Therefore, $$EeIe = 1/3 \times W \times (h13 + h12u/2 + h12d/2)^3/\delta =$$
$$1/3 \times W \times (h13 + h12u/2 + h12d/2)^3/(a1u - a1d) =$$
$$703.7 \ [Nmm^2]$$

is obtained. Therefore, the bending moment M exerted by Example 1A when a condition of δ=a1u−a1d is satisfied can be provisionally calculated.

$$M = 3EeIe \times (a1u - a1d)/(h13 + h12u/2 + h12d/2)^2 = 133.5° \ [Nmm^2]$$

When the bending moment is applied in the expander spacer 4 and the expander spacer 4 is rotated about the center G by 5.6 [degrees], an increase in the side sealing force F2u acting on the oil ring groove upper surface 52 and a decrease in the side sealing force F2d acting on the oil ring groove lower surface 53 are expressed as follows.

(i) Increase in F2u $$W(\tan(15 + 5.6) - \tan 15) =$$
$$86.7 \times (0.376 - 0.268) = 9.3 \ [N] \ (\text{increase by } 40\%).$$

(ii) Decrease in F2d $$W(\tan 15 - \tan(15 - 5.6)) =$$
$$86.7 \times (0.268 - 0.166) = 8.9 \ [N] \ (\text{increase by } 38\%).$$

As described above, the tangential tension F1 [N] of Example 1A in the combination of the upper segment thickness a1u and the lower segment thickness a1d (<a1u), that is, δ1=a1u−a1d, is measured in advance. Then, any external force Wn, any bending moment Mn, and any tangential tension Fn [N] can be calculated without measuring any tangential tension Fn [N] of any combination oil ring at any δ=a1u−a1d.

For example, when the condition of δ1=a1u−a1d is satisfied, the external force W1 is equal to πF1, and EeIe=⅓×W1×(h13+h11u/2+h11d/2)³/δ1 is calculated. Then, the suitable external force Wn is expressed as:

$$Wn = 3EeIe\delta/(\text{length of arm of upper year inclined surface and length of arm of lower year inclined surface})^3 = 3EeIe \times (a1u-a1d)/(h13+h11u/2+h11d/2)^3$$

or $$Wn = 3EeIe\delta/(h13 + h12u/2 + h12d/2)^3$$
$$= 3EeIe \times (a1u - a1d)/(h13 + h12u/2 + h12d/2)^3.$$

Further, the suitable bending moment Mn is expressed as:

$$Mn = 3EeIe \times \delta/(h13 + h11u/2 + h11d/2)^2$$
$$= 3EeIe \times (a1u - a1d)/(h13 + h11u/2 + h11d/2)^2$$

or $$Mn = 3EeIe \times \delta/(h13 + h12u/2 + h12d/2)^2$$
$$= 3EeIe \times (a1u - a1d)/(h13 + h12u/2 + h12d/2)^2.$$

The tangential tension Fn with the suitable external force Wn is expressed as:

$$Fn = Wn/\pi.$$

(Description of Relative Relationship Between Expander Spacer Width h13 and Inclination Angle β of Expander Spacer 4 with Respect to Change in Difference Q which is an Apparent Difference Between Upper-Lower Protrusion Amount Under Free State)

Figure 10:
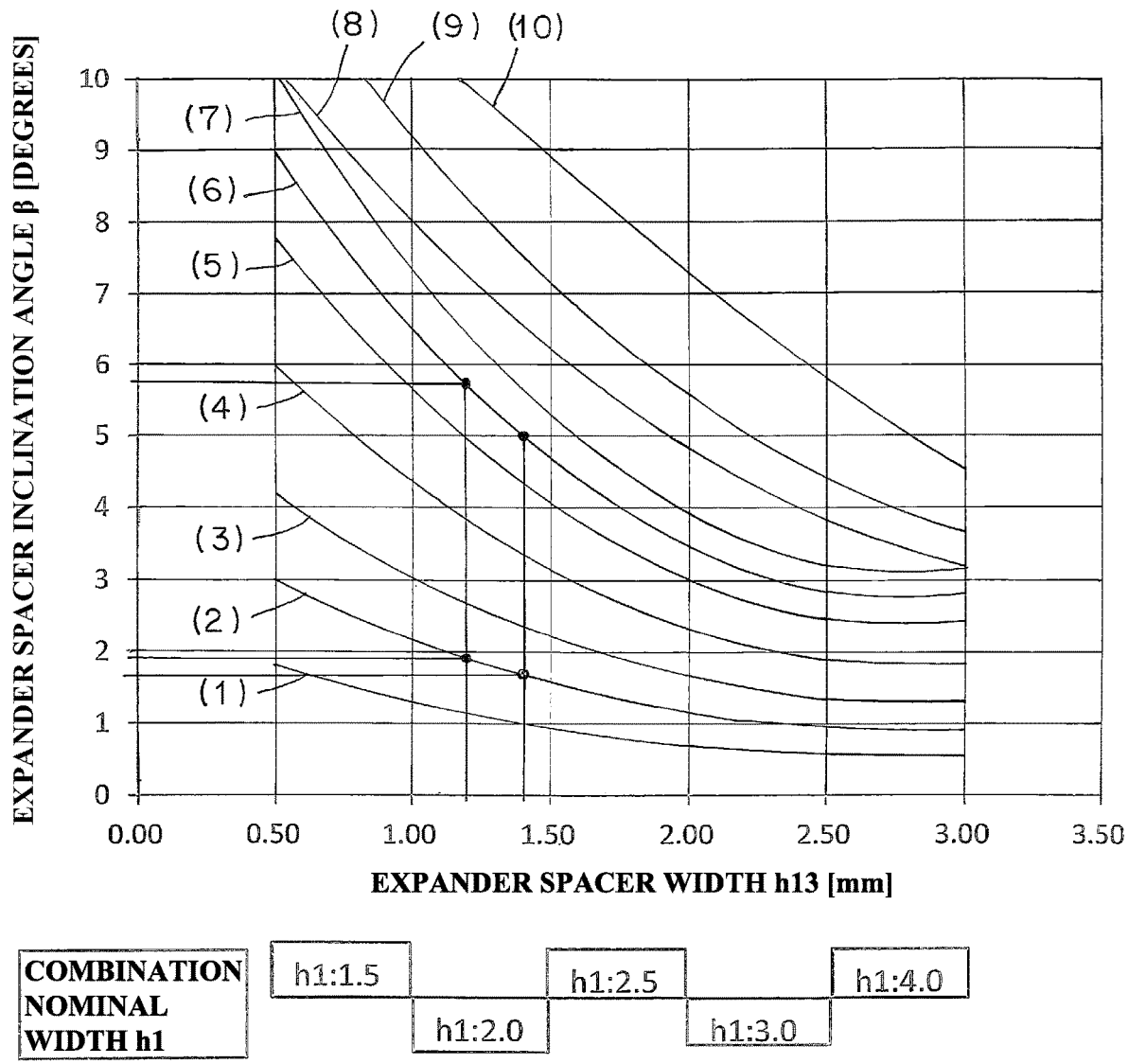
FIG. 10 is a graph for explaining a relative relationship between an expander spacer width and an expander spacer inclination angle.

FIG. 10 is a graph for explanation of a relative relationship between the expander spacer width h13 and the inclination angle β of the expander spacer with respect to a change in difference Q which is the apparent difference between upper-lower protrusion amount under the free state. Specifically, FIG. 10 explains a relationship between the expander spacer inclination angle β [degrees] with respect to the expander spacer width h13 in ranges of the combination nominal width h1, in which the condition of η≥β is satisfied and the center axis CL of the expander spacer 4 is rotated about the center G without being constrained (without interference).

In FIG. 10, the lines (1), (2), (3), (4), (5), (6), (7), (8), (9), and (10) indicate the difference Q which is the apparent difference between upper-lower protrusion amount under the free state. Specifically, a condition of Q=(a1u−a8u)−(a1d−a8d) is satisfied. The difference Q indicated by the line (1) is 0.03 [mm]. The difference Q indicated by the line (2) is 0.05 [mm]. The difference Q indicated by the line (3) is 0.07 [mm]. The difference Q indicated by the line (4) is 0.10 [mm]. The difference Q indicated by the line (5) is 0.13 [mm]. The difference Q indicated by the line (6) is 0.15 [mm]. The difference Q indicated by the line (7) is 0.17 [mm]. The difference Q indicated by the line (8) is 0.20 [mm]. The difference Q indicated by the line (9) is 0.23 [mm]. The difference Q indicated by the line (10) is 0.30 [mm]

FIG. 10 can be read as follows. When, for example, the combination nominal width h1 is equal to 2.0 [mm] and the upper segment nominal width and the lower segment nominal width h12 are equal to 0.4 [mm], the expander spacer width h13 is equal to h1−2×h12=1.2 [mm]. Therefore, when Q is equal to 0.05 mm, which is indicated by the line (2), the expander spacer inclination angle β is 1.9 [degrees]. When Q is equal to 0.15 mm, which is indicated by the line (6), the expander spacer inclination angle β is 5.7 [degrees].

Further, FIG. 10 can be read as follows. When the combination nominal width h1 is equal to 2.0 [mm] and the upper segment nominal width and the lower segment nominal width h12 are equal to 0.3 mm, the expander spacer width h13 is equal to h1−2×h12=1.4 [mm]. Therefore, when Q is equal to 0.05 mm, which is indicated by the line (2), the expander spacer inclination angle β is 1.7 [degrees]. When Q is equal to 0.15 mm, which is indicated by the line (6), the expander spacer inclination angle β is 5.0 [degrees].

From FIG. 10, for the combination nominal with h1 falling within a range of from 1.5 mm to 4.0 mm, the expander spacer inclination angle β can be selected to be 1 [degree] or larger, 3 [degrees] or larger, or 4 [degrees] or larger when the difference Q which is the apparent difference between upper-lower protrusion amount under the free state falls within a range of from 0.03 mm to 0.30 mm.

(Description of Comparison of Oil Film Thicknesses Between Example 1A and Comparative Example 1B)

Now, a comparison of the oil film thicknesses between Example 1A and Comparative Example 1B is described with reference to FIG. 11 to FIG. 13. In FIG. 11 to FIG. 13, the oil film thickness corresponds to an oil quantity.

The inventor of the present invention described specific dimensional numerical values in the paragraphs [0117] and [0118], and tested Example 1A in which the difference Q which is the apparent difference between upper-lower protrusion amount under the free state was 0.15 [mm] and Comparative Example 1B in which the difference Q which is the apparent difference between upper-lower protrusion amount under the free state was 0 [mm], and observed an oil film thickness at the periphery of Example 1A, an oil film thickness at the periphery of Comparative Example 1B, and an oil film thickness (oil quantity) on a land with use of a floating-liner type single-cylinder scotch-yoke mechanism and a laser induced fluorescence (LIF) method. In the measurement of the oil film thickness, the tension of Example 1A and the tension of Comparative Example 1B were set to the same value, which was 20 [N]. For Example 1A, in the combination of the upper segment thickness a1u, which was equal to 2.02 [mm], and the lower segment thickness a1d, which was equal to 1.87 [mm], Q was equal to 0.15 [mm]. For Comparative Example 1B, in the combination of the upper segment thickness a1u and the lower segment thickness a1d, each being equal to 1.87 [mm], Q was 0 [mm].

FIG. 11 is a partial schematic sectional view for illustrating an oil-film thickness measurement device 8. The oil-film thickness measurement device 8 included a cylinder liner 81, a piston 82, a connecting rod 83, a holding member 84, an upper-part oil-film measurement sensor 85, and a middle-part oil-film measurement sensor 86. The top ring 56, the second ring 57, and Example 1A or Comparative Example 1B were mounted to the piston 82.

The cylinder liner 81 had a bore diameter of 86 [mm] and a stroke of 86 [mm]. A bore surface roughness was a plateau roughness, and a condition of Rk+Rpk=0.37 [μm] was satisfied. The top ring 56 had a width of 1.2 [mm] in the axial direction, a barrel-shaped outer peripheral surface, and a CrN-based PVD coating as an outer peripheral sliding surface. The second ring 57 had a width of 1.2 [mm] in the axial direction, a tapered outer peripheral surface, and a CrN-based PVD coating as an outer peripheral sliding surface. Example 1A and Comparative Example 1B, each having the tangential tension of 20 [N], the barrel shape as the outer peripheral shape, and the CrN-based PVD coating as the outer peripheral sliding surface, were tested, and free rotation of each was constrained inside the cylinder liner 81. An engine rpm was set to 600 rpm, 1,000 rpm, and 1,500 rpm, an oil temperature was set to 80° C., an engine lubricating oil of 0W-20 was used, and oil jet feeding was used for oil lubrication.

Figure 12A:
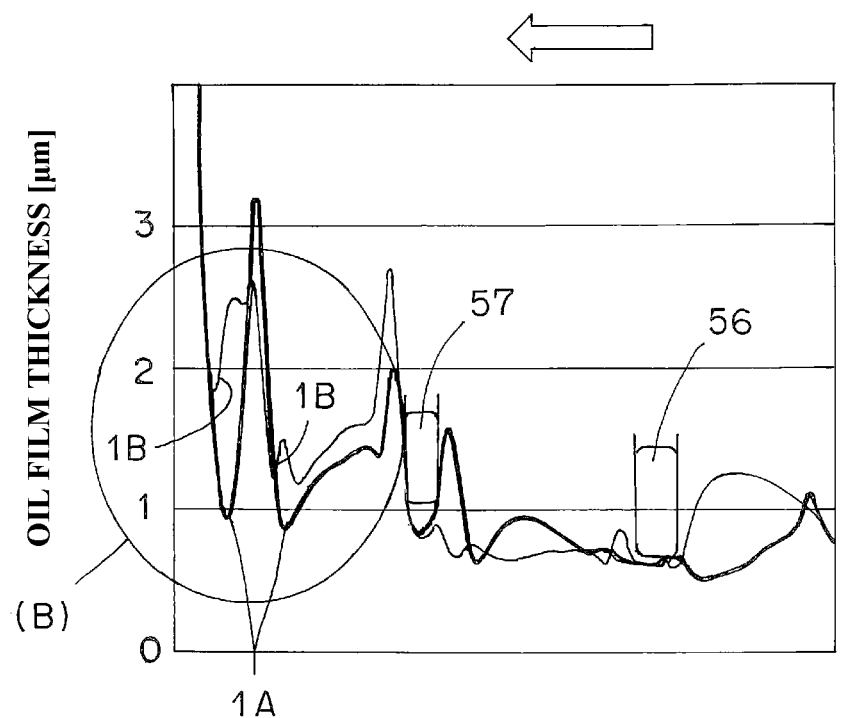
FIG. 12(A) is a graph for explaining a result of measurement with use of the oil-film thickness measurement device of FIG. 11, that is, for explaining an oil film thickness in the middle of a down stroke.
Figure 12B:
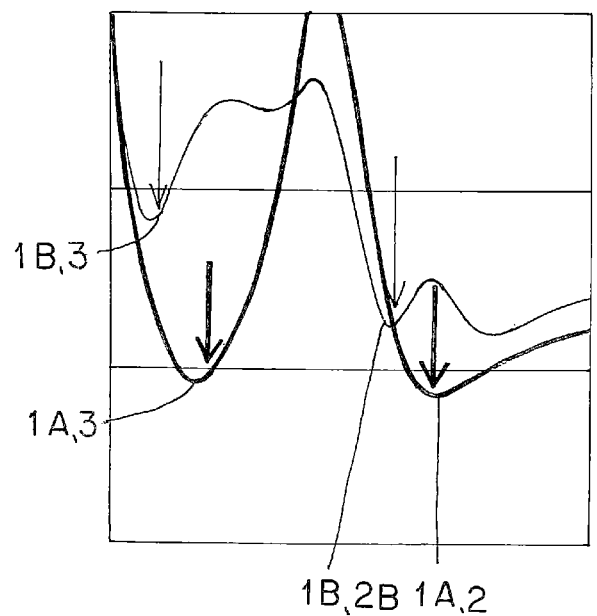
FIG. 12(B) is a partially enlarged graph (enlarged graph of a portion (B) in FIG. 12(A)).

FIG. 12(A) and FIG. 12(B) are graphs for explaining results of measurements with use of the oil-film thickness measurement device of FIG. 11. FIG. 12(A) is a graph for showing the oil film thickness (oil quantity) measured by the middle-part oil film measurement sensor 86 in the middle of a down stroke. FIG. 12(B) is a partially enlarged graph (enlarged graph of a portion (B) of FIG. 12(A)). The outlined arrow in FIG. 12(A) indicates the down stroke, and the arrow is oriented toward the lower side, specifically, the side away from the cylinder head.

Figure 13A:
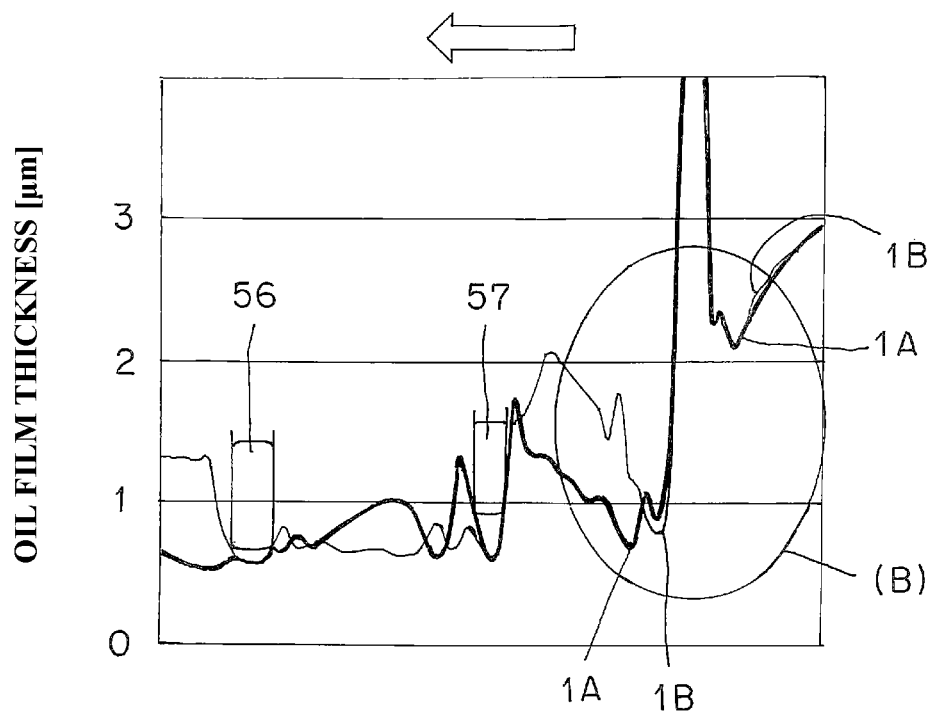
FIG. 13(A) is a graph for explaining a result of measurement with use of the oil-film thickness measurement device of FIG. 11, that is, for explaining the oil film thickness in the middle of an up stroke.
Figure 13B:
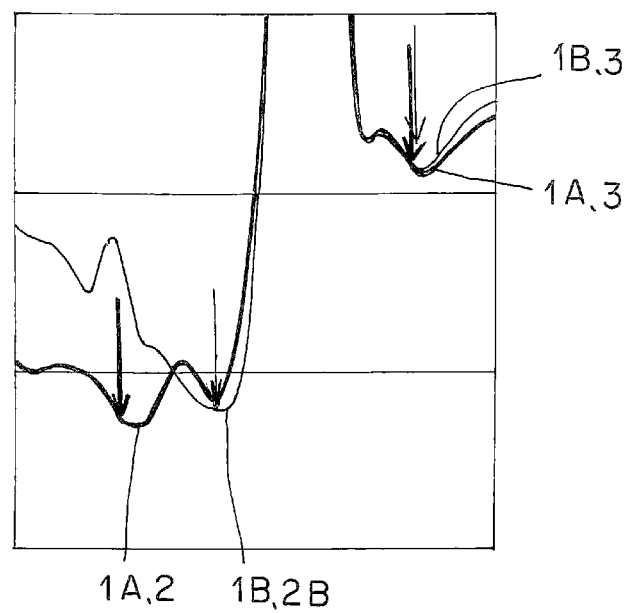
FIG. 13(B) is a partially enlarged graph (enlarged graph of a portion (B) in FIG. 13(A)).

FIG. 13(A) and FIG. 13(B) are graphs for explaining results of measurements with use of the oil-film thickness measurement device of FIG. 11. FIG. 13(A) is a graph for explaining the oil film thickness (oil quantity) measured by the middle-part oil film measurement sensor 86 in the middle of an up stroke. FIG. 13(B) is a partially enlarged graph (enlarged graph of a portion (B) of FIG. 13(A)). The outlined arrow in FIG. 13(A) indicates the up stroke, and the arrow is oriented toward the upper side, specifically, the cylinder head side.

In FIG. 12(A), FIG. 12(B), FIG. 13(A), and FIG. 13(B), the thick lines represent the oil film thickness (oil quantity) in Example 1A, and the thin lines represent the oil film thickness (oil quantity) in Comparative Example 1B. In FIG. 12(A), FIG. 12(B), FIG. 13(A), and FIG. 13(B), there are shown the results of measurements of the oil film thickness at the periphery of the top ring 56, the second ring 57, Example 1A, or Comparative Example 1B with use of the middle-part oil-film measurement sensor 86 during the down stroke and the up stroke when the engine revolution was 1,500 rpm.

Example 1A and Comparative Example 1B, each having the characteristics described above, are now considered. The cylinder liner 81 and the piston 82 of the oil-film thickness measurement device 8 of FIG. 11 correspond to the cylinder block 6 and the piston 50 of Example 1A of FIG. 6(A) and Comparative Example 1B of FIG. 6(B) each being in the closed state. The corresponding portions are denoted by the parenthesized reference symbols.

During the down stroke of FIG. 12(A) and FIG. 12(B), an outer peripheral sliding portion of the upper segment 2 and an outer peripheral sliding portion of the lower segment 3 of Example 1A (each outer peripheral sliding portion being a portion having a small oil film thickness; indicated by 1A in FIG. 12(A)) are located closer to the second ring 57 than an outer peripheral sliding portion of the upper segment 2B and an outer peripheral sliding portion of the lower segment 3 of Comparative Example 1B (each outer peripheral sliding portion being a portion having a small oil film thickness; indicated by 1B in FIG. 12(A)). The above-mentioned positions mean that Example 1A is positioned on the side closer to the oil ring groove upper surface (52) and has a smaller gap between the upper segment 2 and the oil ring groove upper surface (52) to have the improved sealing property.

The oil film thickness on each of the outer peripheral sliding portion of the upper segment 2 and the outer peripheral sliding portion of the lower segment 3 of Example 1A were about half the oil film thickness on the outer peripheral sliding portion of the lower segment 3 of Comparative Example 1B. In addition, a difference between the oil film thickness on the upper segment 2 and the oil film thickness on the lower segment 3 of Example 1A was smaller than that of Comparative Example 1B. The reason is considered as follows. The expander spacer 4 was inclined upward at the angle α [degrees] toward the outer peripheral side in the radial direction. As a result, the lower ear angle θd=15 [degrees] of the lower ear portion 44 that presses the lower segment 3 was reduced by α=5.6 [degrees] and acted under the thus reduced state to decrease the component force toward the oil ring groove lower surface (53). Specifically, the side sealing force F2d on the lower segment 3 was reduced by 38% as described above. As a result, a protruding property of the lower segment 3 toward the bore wall surface (61) was improved to control the oil film thickness so as to achieve a smaller oil film thickness.

Further, in Example 1A, the oil film thickness on the cylinder head side (side opposite to the orientation of the outlined arrow in FIG. 12(A)) of the top ring 56 was smaller than that in Comparative Example 1B. The reason is considered as follows. The engine lubricating oil, which was scraped down by Example 1A, was returned to an oil pan through the oil return port (55) and therefore did not flow out toward the cylinder head side through a gap between the upper segment 2 and the oil ring groove upper surface (52).

During the up stroke of FIG. 13, the upper segment 2 of Example 1A is positioned closer to the oil ring groove upper surface (52) than that of Comparative Example 1B. It is considered that a distance in the Y direction between the lower surface 23 of the upper segment 2 and the upper surface 32 of the lower segment 3 was longer in Example 1A than in Comparative Example 1B. Specifically, it is considered that the center axis CL of the expander spacer 4 of Example 1A was inclined upward toward the outer peripheral side. As a result, the substantial expander spacer width h13 of Example 1A was larger than that of Comparative Example 1B.

During the up stroke, the oil film thickness on the outer peripheral sliding portion of the upper segment 2 and the oil film thickness on the outer peripheral sliding portion of the lower segment 3 of Example 1A were equal to the oil film thickness on the outer peripheral sliding portion of the upper segment 2B and the oil film thickness on the outer peripheral sliding portion of the lower segment 3 of Comparative Example 1B. During the up stroke, however, the oil quantity on the land immediately above the oil ring groove in combination with Example 1A was about half that on the land immediately above the oil ring groove in combination with Comparative Example 1B. The reason is considered that the oil scraping function of Example 1A during the down stroke was sufficient. Further, it is understood from FIG. 13(A) that the oil quantity remaining on the cylinder head side (side toward which the outlined arrow in FIG. 13(A) is oriented) of the top ring 56 after oil scraping is larger in Comparative Example 1B than in Example 1A.

Further, during the down stroke of FIG. 12(A) and FIG. 12(B), a frictional force, which acts in a direction toward the cylinder head as a result of sliding of each of the top ring 56, second and 57, Example 1A, and Comparative Example 1B, functions as a downward bending moment on the inner peripheral side of each of Example 1A and Comparative Example 1B. However, Example 1A under the closed state has a structure in which the center axis CL of the expander spacer 4 is inclined upward at the angle α (or β; hereinafter denoted by "α") [degrees] toward the outer peripheral side in the radial direction. Therefore, the internal force, which is the bending moment acting against the frictional force described above, is generated in Example 1A. As a result, Example 1A is positioned on the side closer to the oil ring groove upper surface (52) side during the down stroke. Based on the above-mentioned position, it is considered that the gap between the upper segment 2 and the oil ring groove upper surface (52) was reduced to prevent the flow of the engine lubricating oil toward the cylinder head side.

In Example 1A, the upper ear angle θ=15 [degrees] under the free state is increased by the angle α=5.6 [degrees] under the closed state and acts under the thus increased state. Similarly, the lower ear angle θd is reduced by the angle α=5.6 [degrees] and acts under the thus reduced state. As a result, in Example 1A, the protruding force on the upper segment 2 toward the oil ring groove upper surface (52) (side sealing force F2u on the upper segment 2) is increased, whereas the protruding force on the lower segment 3 toward the oil ring groove lower surface (53) (side sealing force F2d on the lower segment 3) is reduced. As a result, the function of improving the protruding property toward the bore wall surface (61) can be fulfilled.

(Description of Consideration of Example 1A)

Based on the behavior of Example 1A and the results of oil consumption tests, which have been described above, the following is considered for Example 1A.

The lower ear angle θd acts under the reduced state in Example 1A in comparison to that in Comparative Example 1B. As a result, a high protruding property of the lower segment 3 toward the bore wall surface (61) is obtained. Specifically, based on the above-mentioned results of measurements of the oil film thickness, the oil film thickness on the outer peripheral sliding portion of the lower segment 3 of Example 1A was reduced to be half that on the outer peripheral sliding portion of the lower segment 3 of Comparative Example 1B during the down stroke. Based on this result, it is considered that the lower segment 3 fully fulfilled the oil scraping performance for the bore wall surface (61) in Example 1A.

Example 1A is positioned on the side closer to the oil ring groove upper surface (52) during the down stroke. In addition, the upper ear angle θu acts under the increased state in Example 1A in comparison to that in Comparative Example 1B. Therefore, the protruding force on the upper segment 2 (side sealing force F2u on the upper segment 2) toward the oil ring groove upper surface (52) is large. Based on the above-mentioned result, the following is considered. In Example 1A, the sealing property between the upper segment 2 and the oil ring groove upper surface (52) was improved to prevent an oil loss through the gap therebetween. As a result, the engine lubricating oil that was scraped down by the upper segment 2 and the lower segment 3 was sufficiently discharged from the oil return port.

Further, during the up stroke, the oil quantity on the land immediately above the oil ring groove (51) in combination with Example 1A was about half that in combination with Comparative Example 1B. The oil quantity on the cylinder head side of the top ring 56 in combination with Example 1A was also smaller than that in combination with Comparative Example 1B. The reason is considered that the reduction in oil quantity was achieved as a result of the improvement in oil scraping performance during the down stroke in Example 1A.

(Description of Effects of First Embodiment)

The combination oil ring 1A according to the first embodiment has the configuration and the functions described above. The effects thereof are now described below.

In the combination oil ring 1A according to the first embodiment, the thickness dimension a1u of the upper segment 2 is larger than the thickness dimension a1d of the lower segment 3, as illustrated in FIG. 2(B) and FIG. 2(C). With the thickness dimensions described above, when the combination oil ring 1A is in the free state, the upper protrusion amount P1 of the upper segment 2 is larger than the lower protrusion amount P2 of the lower segment 3, as illustrated in FIG. 1(A). Therefore, there is the difference P between the upper protrusion amount P1 of the upper segment 2 and the lower protrusion amount P2 of the lower segment 3.

As a result, when the combination oil ring 1A is in the closed state, the bending moment M is generated as the internal force of the expander spacer 4 due to the upper-lower protrusion amount difference P, as illustrated in FIG. 6(A). Further, the center axis CL of the expander spacer 4 is rotated and inclined upward about the center G by the angle α [degrees] toward the outer peripheral side in the X direction without being constrained (without interference).

As a result, the upper ear angle θu is increased by the angle α [degrees] and acts under the thus increased state. Therefore, the side sealing forces F2 (F2u) of the upper segment 2 to the oil ring groove upper surface 52 is increased by the amount corresponding to the angle α [degrees], that is, by F1 (tan (θu+α)−tan θu) [N]. Thus, the sealing performance is improved. The lower ear angle θd is reduced by the angle α [degrees] and acts under the thus reduced state. Therefore, the side sealing force F2 (F2d) of the lower segment 3 to the oil ring groove lower surface 53 is decreased by the amount corresponding to the angle α [degrees], that is, by F1(tan θd−tan(θd−α)) [N]. Thus, the protruding property of the lower segment 3 toward the bore wall surface 61 is improved. As a result, the function of reducing the oil film thickness on the lower segment 3 is fulfilled. As described above, the combination oil ring 1A allows to reduce the oil consumption in comparison to the combination oil ring 1B of the comparative example, which does not have upper-lower protrusion amount difference P (P=0), as shown in FIG. 12(A), FIG. 12(B), FIG. 13(A), and FIG. 13(B).

In the combination oil ring 1A according to the first embodiment, the side clearance Sc under the closed state is "zero", and the expander spacer 4 is held in contact with the upper segment 2 at the position A (the outer peripheral-side end portion of the upper support upper surface) and with the lower segment 3 at the position C (the inner peripheral-side end portion of the lower support lower surface) due to the bending moment M, as illustrated in FIG. 9(A). Under the above-mentioned state, the force (upper side sealing force) Fsu for pressing the upper segment 2 upward is generated at the position A. As a result, the sealing performance between the upper segment 2 and the oil ring groove upper surface 52 is further improved. The force (lower side sealing force) Fsd (Fsd=Fsu) for pressing the lower segment 3 downward acts at the position C as the reaction force of Fsu. As a result, the lower segment 3 is pressed against the oil ring groove lower surface 53 to improve the sealing performance between the lower segment 3 and the oil ring groove lower surface 53.

In particular, for the combination oil ring 1A according to the first embodiment, a dimensional range of 0.06 [mm] Q0.18 [mm] is preferred. As a result, the combination oil ring 1A allows to reduce the oil consumption in comparison to the combination oil ring 1B of the comparative example, as shown in FIG. 12(A), FIG. 12(B), FIG. 13(A), and FIG. 13(B) (in a case of Q=0.15 [mm]).

(Description of Relative Relationship Between Oil Consumption Ratio and Difference Q [Mm] which is the Apparent Difference Between Upper-Lower Protrusion Amount)

Figure 15:
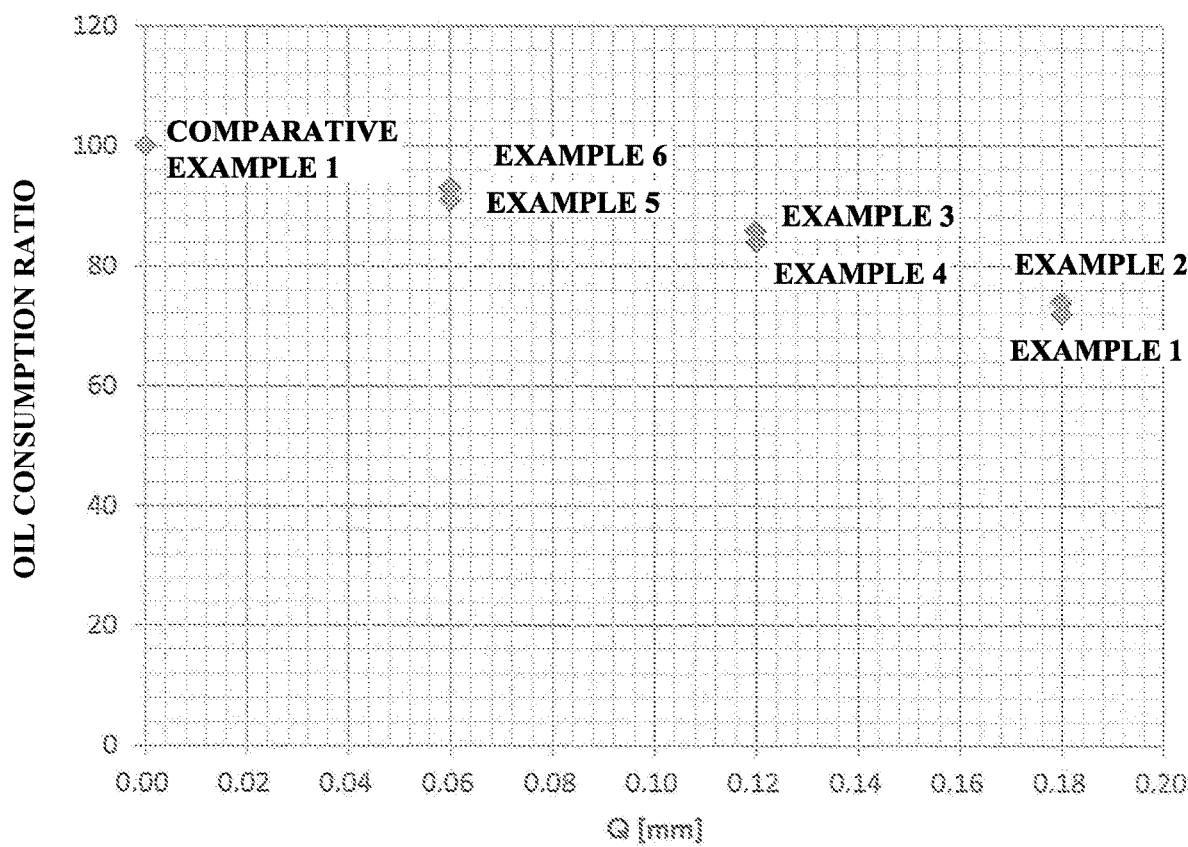
FIG. 15 is a graph for explaining a relative relationship between upper-lower apparent protrusion amount differences Q [mm] and the oil consumption ratios in Examples 1, 2, 3, 4, 5, and 6, and Comparative Example 1 based on the specific numerical values of FIGS. 14(A),14(B), and 14(C).

Now, a relative relationship between an oil consumption ratio and the difference Q [mm] which is the apparent difference between upper-lower protrusion amount is described based on specific numerical values with reference to FIG. 14 (A), FIG. 14 (B), FIG. 14 (C), and FIG. 15.

FIG. 14 (A), FIG. 14 (B), and FIG. 14 (C) are tables for explaining specific numerical values of Examples 1, 2, 3, 4, 5, 6, and Comparative Example 1. In FIG. 14(A), a type I of the combination oil ring corresponds to the first embodiment, a type II corresponds to a second embodiment (described later), and a type III corresponds to the comparative example. The combination nominal width h1 is set to 2.0 mm. FIG. 14(A) is a table for explaining the combination nominal width h1 [mm] and specific numerical values of the segments, specifically, specific numerical values of the upper segment thickness a1u, the upper segment nominal width h12u, the lower segment thickness a1d, and the lower segment nominal width h12d.

FIG. 14(B) is a table for explaining specific numerical values of an expander spacer of FIG. 19, specifically, specific numerical values of the expander spacer width h13, the upper spacer thickness a8u, the lower spacer thickness a8d, the support portion length a3 (upper support portion length a3u=lower support portion length a3d), the spacer support portion height h2 (upper spacer support portion height h2u=lower spacer support portion height h2d), an upper/lower piece clearance height h3 (upper piece clearance height h3u=lower piece clearance height h3d), the angle η formed between the line segment CE and the center axis CL, the angle θ1 formed between the line segment AC and the outer peripheral-side end surface 47 of the expander spacer 4, the length L of the line segment between the position A and the position C, and the upper ear angle θu and the lower ear angle θd, in which θu=θd.

FIG. 14(C) is a table for explaining combination oil ring characteristic values, specifically, specific numerical values of the side clearance Sf under the free state, the upper apparent protrusion amount Q1 of the upper segment 2, which is expressed as: Q1=(a1u−a8u), the lower apparent protrusion amount Q2 of the lower segment 3, which is expressed as: Q2=(a1d−a8d), the difference Q which is the apparent difference between Upper-Lower Protrusion Amount under the free state, which is expressed as: ((a1u−a8u)−(a1d−a8d))=Q, the acute angle θ2 formed between the line segment AC and the Y direction, the tilted rotation angle α (=β) of the center axis CL of the expander spacer, a lower year angle θd−α under the closed state, the side clearance Sc (not shown) under the closed state, the distance t1 in the X direction between the position of the upper ear portion 43 in the X direction, at which the upper spacer thickness a8u is defined, and the inner peripheral-side vertex of the upper segment 2, the distance t2 in the X direction between the position of the lower ear portion 44 in the X direction, at which the lower spacer thickness a8d is defined, and the inner peripheral-side vertex of the lower segment 3, the upper protrusion amount P1, the lower protrusion amount P2, the upper-lower protrusion amount difference P, and the oil consumption ratio.

In this case, in Comparative Example 1, Q is equal to 0.00 [mm], and α is equal to 0 [degree]. The oil consumption ratio of Comparative Example 1 is defined as "100". Meanwhile, in Example 1, Q is equal to 0.18 [mm], α is equal to 6.77 [degrees], and the oil consumption ratio is "72". In Example 2, Q is equal to 0.18 [mm], α is equal to 6.77 [degrees], and the oil consumption ratio is "74". In Example 3, Q is equal to 0.12 [mm], α is equal to 4.5 [degrees], and the oil consumption ratio is "86". In Example 4, Q is equal to 0.12 [mm], α is equal to 4.5 [degrees], and the oil consumption ratio is "84". In Example 5, Q is equal to 0.06 [mm], a is equal to 2.25 [degrees], and the oil consumption ratio is "91". In Example 6, Q is equal to 0.06 [mm], α is equal to 2.25 [degrees], and the oil consumption ratio is "93".

As described above, in the combination oil ring 1A according to the first embodiment, when Q falling within the dimensional range of 0.06 [mm]Q0.18 [mm] and a range of 2 [degrees]<α=β<7 [degrees] are preferred as a design calculation based on FIG. 14(C) although the angle α (=β) cannot be measured. In Example 6, Q is equal to 0.06 [mm], α is equal to 2.25 [degrees], and the oil consumption ratio is "93". Therefore, it is difficult to improve the oil consumption with the angle α (=β) falling within a range of α=132 [degrees]. In a case in which the angle α (=β) falls within a range of 7 [degrees]≤α=β, the increase in side sealing force exceeds 50% when the upper ear angle θu and the lower ear angle θd are equal to 15 [degrees]. Further, the expander spacer 4 is rotated and inclined by the angle β [degrees], the gap in the Y direction between the combination oil ring and the oil ring groove is reduced to be closer to zero. As a result, the side sealing force is increased, and the followability to the bore wall surface 61 tends to degrade.

The upper apparent protrusion amount Q1 of the upper segment 2 and the lower apparent protrusion amount Q2 of the lower segment 3 are set based on an abrasion speed of the outer peripheral surfaces 20 and 30 of the segments in the engine to be adopted, and generally fall within a range of from 0.15 to 0.65. For the hard chromium plating coating, for example, the upper apparent protrusion amount Q1 and the lower apparent protrusion amount Q2 are set to fall within a range of from 0.35 to 0.65 in many cases. For the DLC coating that is excellent in abrasion resistance, the upper apparent protrusion amount Q1 and the lower apparent protrusion amount Q2 are set to fall within a range of from 0.15 to 0.45 in many cases. Therefore, for the upper-lower apparent protrusion amount difference Q, a range of 0 [mm]≤Q0.5 [mm] can be set in practice. When the value of Q of the combination oil ring is increased while the same combination nominal width h1 is used, the expander spacer inclination angle β is also increased based on the graph of FIG. 10 for showing the relative relationship between the expander spacer width and the expander spacer inclination angle.

When the combination nominal width h1 is 2.5 mm or smaller, it is preferred that Q be 0.23 mm or smaller and β be 7 [degrees] or smaller. When the combination nominal width h1 is larger than 2.5=, it is preferred that Q be 0.23 mm or smaller and β be 6 [degrees] or smaller. When the inclination angle β is large, the frictional force between the combination oil ring and the oil ring groove upper surface 52 is increased to degrade the followability of the upper segment 2 to the bore wall surface 61, which brings an increase in oil consumption.

(Description of Second Embodiment)

Figure 16:
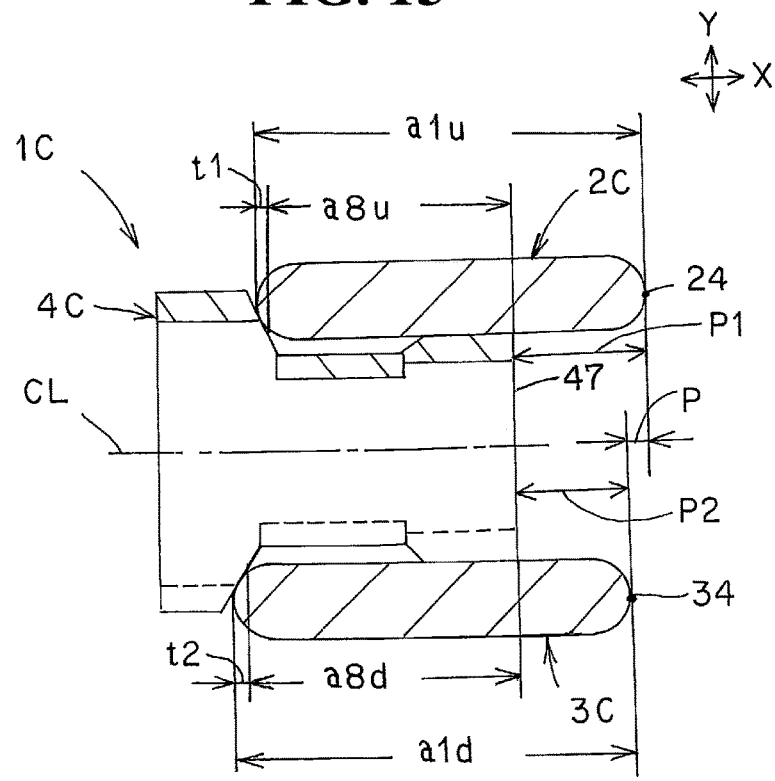
FIG. 16 is a schematic sectional view for illustrating a combination oil ring according to a second embodiment (a8u<a8d) of the present invention, which is in the free state.
Figure 17:
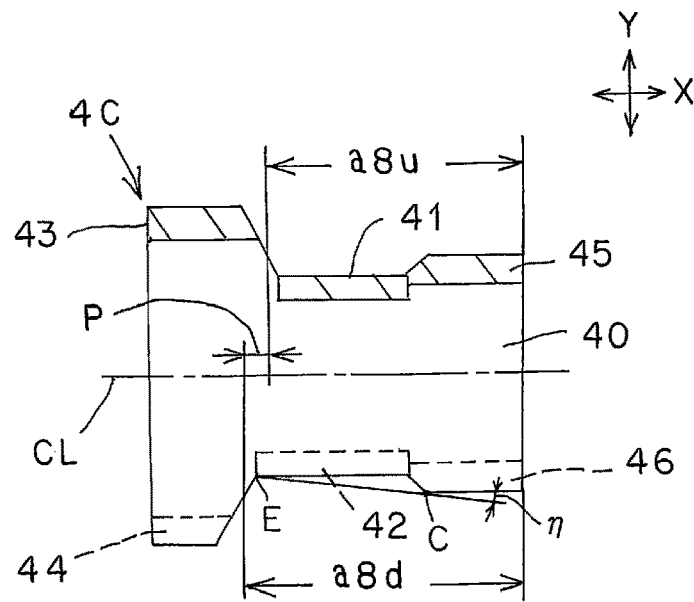
FIG. 17 is a schematic sectional view for illustrating an expander spacer of FIG. 16.
Figure 18:
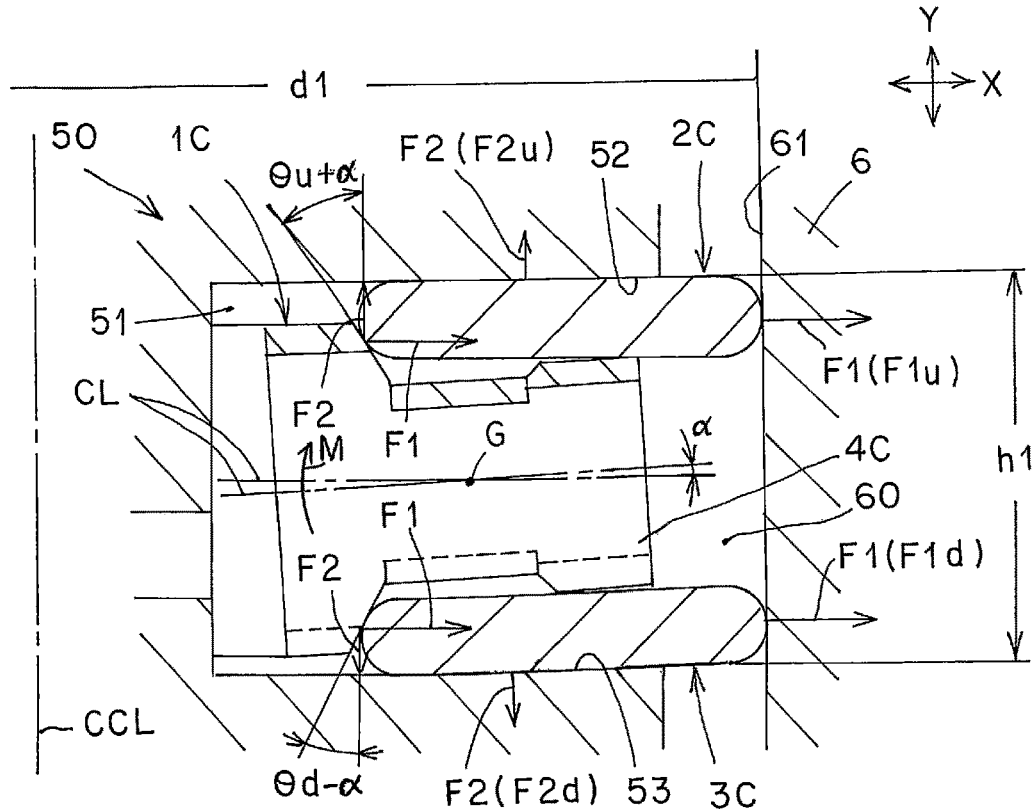
FIG. 18 is a schematic sectional view for illustrating the combination oil ring of FIG. 16, which is in the closed state.

FIG. 16 to FIG. 18 are illustrations of a combination oil ring according to a second embodiment of the present invention. Now, a combination oil ring 1C according to the second embodiment is described. In FIG. 16 to FIG. 18, the same reference symbols as those used in FIG. 1 to FIG. 15 denote the same portions and dimensions.

(Description of Configuration of Second Embodiment)

In the above-mentioned combination oil ring 1A according to the first embodiment, conditions of a8u=a8d and a1u>a1d are satisfied under the free state illustrated in FIG. 1(A).

Specifically, when the upper spacer thickness a8u and the lower spacer thickness a8d are equal to each other, the thickness a1u of the upper segment 2 is larger than the thickness a1d of the lower segment 3. Specifically, when a condition of t1=t2 is satisfied in FIG. 1(A), the thickness a1u of the upper segment 2 is larger than the thickness a1d of the lower segment 3 by the upper-lower protrusion amount difference P.

Meanwhile, in the combination oil ring 1C according to the second embodiment, conditions of a1u=a1d and a8u<and a8d are satisfied under the free state illustrated in FIG. 16.

Specifically, when the thickness a1u of the upper segment 2 and the thickness a1d of the lower segment 3 are equal to each other, the upper spacer thickness a8u is smaller than the lower spacer thickness a8d. Specifically, when a condition of t1=t2 is satisfied in FIG. 16, the upper spacer thickness a8u is smaller than the lower spacer thickness a8d by the upper-lower protrusion amount difference P.

As a result, in the combination oil ring 1C according to the second embodiment, the upper protrusion amount P1 from the outer peripheral-side end surface 47 of an expander spacer 4C to the outer peripheral surface vertex 24 of the upper segment 2 is larger than the lower protrusion amount P2 from the outer peripheral-side end surface 47 of the expander spacer 4C to the outer peripheral surface vertex 34 of the lower segment 3, as in the above-mentioned combination oil ring 1A according to the first embodiment.

Specifically, the thickness of the upper segment 2 is set to a1u [mm], and the thickness of the lower segment 3 is set to a1d [mm], which satisfy a condition of a1u=a1d. The upper spacer thickness is set to a8u [mm], and the lower spacer thickness is set to a8d [mm]. Under the above-mentioned dimensional conditions, Expressions (1), (2), and (3) are satisfied.

$$Q1 = a1u - a8u > P1 > 0 \quad (1),$$

$$Q2 = a1d - a8d > P2 > 0 \quad (2), \text{ and}$$

when a condition of Q1−P1=Q2-P2 is satisfied, Q1−Q2=P1−P2 is established, and $$Q = Q1 - Q2 = (a1u - a8u) - (a1d - a8d) > 0 \quad (3),$$

where Q1 is a difference between the thickness a1u of the upper segment 2C and the upper spacer thickness a8u, and is referred to as "upper apparent protrusion amount", Q2 is a difference between the thickness a1d of the lower segment 3C and the lower spacer thickness a8d, and is referred to as "lower apparent protrusion amount", and Q is a difference (Q1−Q2) between the upper apparent protrusion amount Q1 and the lower apparent protrusion amount Q2.

When a nominal width dimension of the upper segment is set to h12u [mm], a nominal width dimension of the lower segment is set to h12d [mm], an upper ear angle, which is an acute angle formed between the inclined surface of the upper ear portion of the expander spacer and the axial direction of the cylinder, is set to θu [degrees], and a lower ear angle, which is an acute angle formed between the inclined surface of the lower ear portion of the expander spacer and the axial direction of the cylinder, is set to θd [degrees], it is preferred that the nominal width dimension h12u or the nominal width dimension h12d fall within a range of from 0.3 [mm] to 0.6 [mm] and the upper ear angle θu or the lower ear angle θd fall within a range of from 5 [degrees] to 30 [degrees], and that the difference Q between the upper apparent protrusion amount Q1 and the lower apparent protrusion amount Q2 satisfy a dimensional range expressed by the following Expression (10) or a dimensional range expressed by the following Expression (11):

when the nominal width dimension h12u or the nominal width dimension h12d falls within a range of from 0.3 [mm] to 0.45 [mm], $$0.085 \text{ [mm]} \leq Q \leq 0.18 \text{ [mm]} \quad (10), \text{ or}$$

when the nominal width dimension h12u or the nominal width dimension h12d is larger than 0.45 [mm] and equal to or smaller than 0.60 [mm], $$0.110 \text{ [mm]} \leq Q \leq 0.23 \text{ [mm]} \quad (11).$$

(Description of Functions of Second Embodiment)

The combination oil ring 1C according to the second embodiment has the configuration described above, and therefore achieves the same functions as those achieved by the above-mentioned combination oil ring 1A according to the first embodiment.

Specifically, the combination oil ring 1C is mounted in the oil ring groove 51 of the piston 50, and the combination oil ring 1C and the piston 50 are mounted inside the cylinder bore 60. Then, the bending moment M acts in the expander spacer 4C due to the upper-lower protrusion amount difference P. As a result, the center axis CL of the expander spacer 4C is rotated and inclined upward about the center G by the angle α [degrees] toward the outer peripheral side in the X direction without being constrained (without interference).

As a result, the combination oil ring 1C according to the second embodiment is brought into the closed state, as illustrated in FIG. 18.

The closed state of the combination oil ring 1C according to the second embodiment, which is illustrated in FIG. 18, is similar to the closed state of the combination oil ring 1A according to the first embodiment, which is illustrated in FIG. 6(A). As a result, in the combination oil 1C under the closed state, which is illustrated in FIG. 18, the external forces (protruding forces) 2F1 (F1u and F1d) act on the bore wall surface 61, and the external force (side sealing force) F2 (F2u, F2d) acts on each of the oil ring groove upper surface 52 and the oil ring groove lower surface 53.

In the combination oil ring 1C according to the second embodiment, when a condition of 5=a1u−a1d is satisfied, the external force W, the bending moment M, and the tangential tension F, which are exerted by the combination oil ring 1C according to the second embodiment, can be provisionally calculated, as in the above-mentioned combination oil ring 1A according to the first embodiment.

(Description of Effects of Second Embodiment)

The combination oil ring 1C according to the second embodiment has the configuration and the functions described above, and therefore achieves the same effects as those achieved by the above-mentioned combination oil ring 1A according to the first embodiment.

Specifically, under the closed state illustrated in FIG. 18, the combination oil ring 1C according to the second embodiment is rotated and inclined by the angle α [degrees] due to the bending moment M. As a result, the upper ear angle θu is increased by the angle α [degrees] and acts under the thus increased state. Therefore, the side sealing force F2 (F2u) acting on the upper segment 2 toward the oil ring groove upper surface 52 is increased by the amount corresponding to the angle α [degrees], that is, by F1(tan(θu+α)−tan θu) [N] to improve the sealing performance. Further, the lower ear angle θd is reduced by the angle α [degrees] and acts under the thus reduced state. Therefore, the side sealing force F2 (F2d) acting on the lower segment 3 toward the oil ring groove lower surface 53 is decreased by the amount corresponding to the angle α [degrees], that is, by F1 (tan≥d−tan (θd−α)) [N]. Thus, the protruding property of the lower segment 3 toward the bore wall surface 61 is improved. As a result, the function of reducing the oil film thickness on the lower segment 3 is fulfilled.

As described above, similarly to the combination oil ring 1A according to the first embodiment, the combination oil ring 1C according to the second embodiment can reduce the oil consumption.

(Description of First Modification Example of Expander Spacer)

FIG. 19 is an illustration of a first modification example of the expander spacer included in the combination oil ring according to the present invention. Now, an expander spacer 4D according to the first modification example is described. In FIG. 19, the same reference symbols as those used in FIG. 1 to FIG. 18 denote the same portions and dimensions.

In the present invention, the expander spacer 4, 4C, 4D is rotated and inclined by the angle α [degrees] under the closed state. Therefore, the angle formed between the line segment CE and the center axis CL in FIG. 2(A), FIG. 17, and FIG. 19 is η. Then, when a condition of η≥α is satisfied, the expander spacer 4, 4C, 4D can be freely rotated without being constrained (without interference) and therefore can fulfill original performance. Thus, it is preferred to adopt the first modification example of the expander spacer to a sectional structure of the expander spacer 4, 4C according to the present invention. It is preferred to form the inclination angle η at least on the lower piece side.

An upper piece upper surface 410 of the upper piece 41 and a lower piece lower surface 420 of the lower piece 42 of the above-mentioned expander spacer 4, 4C are parallel to the center axis CL. Meanwhile, the upper piece upper surface 410 of the upper piece 41 and the lower piece lower surface 420 of the lower piece 42 of the expander spacer 4D according to the first modification example are inclined with respect to the center axis CL. Specifically, the upper piece upper surface 410 is inclined downward by A [degrees] from an outer peripheral-side end surface toward an inner peripheral-side end surface with respect to the center axis CL. The lower piece lower surface 420 is inclined upward at A [degrees] from the outer peripheral-side end surface toward the inner peripheral-side end surface with respect to the center axis CL. The expander spacer 4D according to the first modification example has a vertically symmetric shape with respect to the center axis CL.

The expander spacer 4D according to the first modification example has the configuration described above and, therefore has a sectional shape that is preferred to those of the above-mentioned expander spacers 4 and 4C. As a result, functions and effects, which are preferred to those of the above-mentioned expander spacers 4 and 4C, can be achieved.

(Description of Second Modification Example of Expander Spacer)

FIG. 20 is an illustration of a second modification example of the expander spacer included in the combination oil ring according to the present invention. In the second modification example of the expander spacer, the lower piece lower surface 420 is inclined upward at λ [degrees] from the outer peripheral-side end surface toward the inner peripheral-side end surface with respect to the center axis CL, and the inclination angle η is formed between the line segment CE and the center axis CL only on the lower piece side. Thus, it is preferred that the second embodiment be combined with the second modification example of the expander spacer 4E. In FIG. 20, the same reference symbols as those of FIG. 1 to FIG. 19 denote the same portions and dimensions.

(Description of Third Embodiment)

Figure 21:
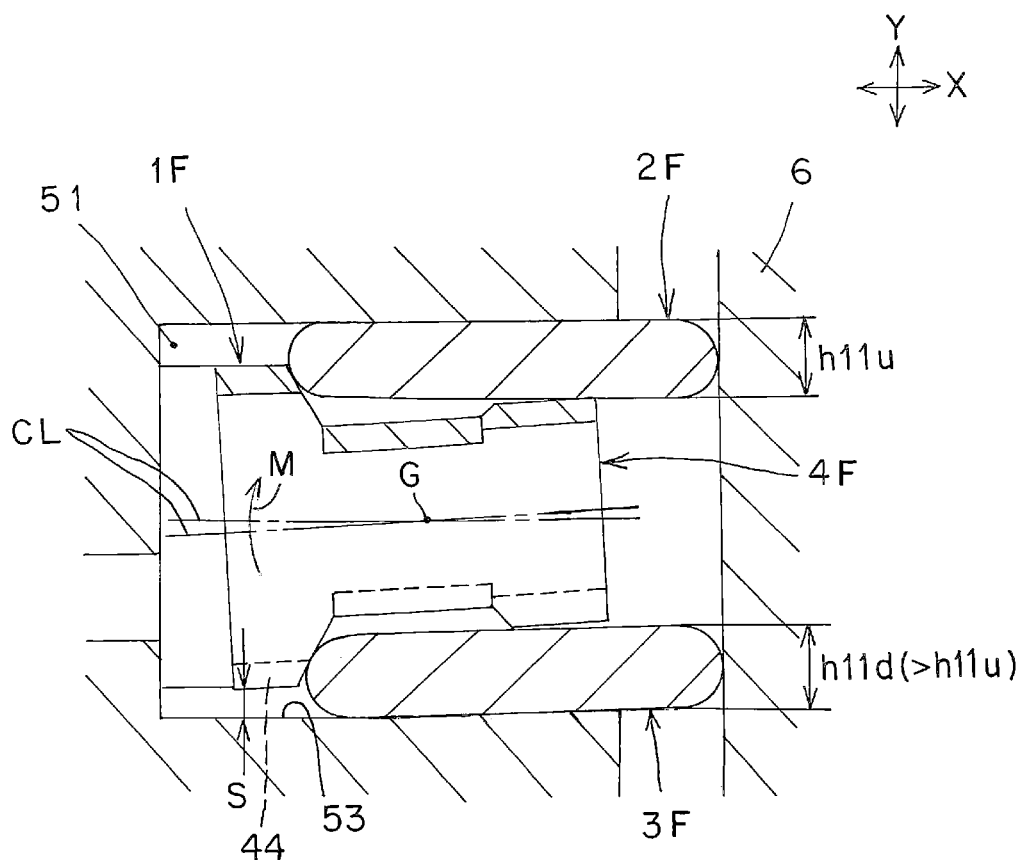
FIG. 21 is a schematic sectional view for illustrating a combination oil ring according to a third embodiment of the present invention, which is in the closed state.

FIG. 21 is an illustration of a combination oil ring according to a third embodiment of the present invention. Now, a combination oil ring 1F according to the third embodiment is described. In FIG. 21, the same reference symbols as those used in FIG. 1 to FIG. 20 denote the same portions and dimensions.

(Description of Configuration of Third Embodiment)

In the combination oil ring 1F according to the third embodiment, a width dimension of an upper segment 2F is set smaller than a width dimension of a lower segment 3F. That is, in the first and second embodiments, when a width dimension of the upper segment is set to h11u [mm], and a width dimension of the lower segment is set to h11d [mm], the following Expression (12) is satisfied:

$$h11u < h11d \quad (12).$$

(Description of Functions of Third Embodiment)

The combination oil ring 1F is mounted in the oil ring groove 51 of the piston 50, and the combination oil ring 1F and the piston 50 are mounted inside the cylinder bore 60. Then, an expander spacer 4F is rotated and inclined by the angle α [degrees] about the center G with the action of the bending moment M generated by the upper-lower apparent protrusion amount difference Q, as illustrated in FIG. 21. As a result, the combination oil ring 1F according to the third embodiment is brought into the closed state.

Under the closed state illustrated in FIG. 21, the lower segment width dimension h11d [mm] is larger than the upper segment width dimension h11u [mm]. As a result, a gap S is formed and maintained between a lower surface of an inner peripheral part of the lower ear portion 44 of the expander spacer 4F and the oil ring groove lower surface 53. In practice, it is preferred to select h12d and h12u so as to satisfy a condition of $h12u+0.05 \text{ [mm]} \le h12d \le h12u+0.15$ [mm].

(Description of Effects of Third Embodiment)

The combination oil ring 1F according to the third embodiment has the configuration and the functions described above, and therefore achieves the same effects as those achieved by the above-mentioned combination oil rings 1A and 1C according to the first and second embodiments.

The invention claimed is:

1. A combination oil ring mounted in an oil ring groove of a piston and configured to be reciprocated inside a cylinder bore in an axial direction of a cylinder together with the piston, the combination oil ring comprising:
   when a cylinder head side in the axial direction of the cylinder is an upper side and a side away from the cylinder head is a lower side,
   an upper segment arranged on the upper side;
   a lower segment arranged on the lower side independently of the upper segment; and
   an expander spacer arranged between the upper segment and the lower segment, the expander spacer comprising:
      an upper ear portion, which is formed at an upper part of an inner peripheral-side end portion so as to protrude upward therefrom, and has an inclined surface contacting with an inner peripheral surface of the upper segment and pressing the upper segment;
      a lower ear portion, which is formed at a lower part of an inner peripheral-side end portion so as to protrude downward therefrom, and has an inclined surface contacting with an inner peripheral surface of the lower segment and pressing the lower segment;
      an upper support portion, which is formed at an upper part of an outer peripheral-side end portion so as to protrude upward therefrom, and has an upper surface contacting with a lower surface of the upper segment and supporting the upper segment; and
      a lower support portion, which is formed at a lower part of an outer peripheral-side end portion so as to protrude downward therefrom, and has a lower surface contacting with an upper surface of the lower segment and supporting the lower segment,
   wherein the expander spacer excluding the upper ear portion and the lower ear portion has a maximum width in the axial direction of the cylinder, which is defined between an outer peripheral-side end portion of the upper support portion and an outer peripheral-side end portion of the lower support portion,
   wherein a state in which the expander spacer, the upper segment, and the lower segment are mounted in the oil ring groove before being inserted into the cylinder bore is defined as a free state,
   wherein, under the free state in which the inclined surface of the upper ear portion of the expander spacer is held in contact with the inner peripheral surface of the upper segment and the inclined surface of the lower ear portion of the expander spacer is held in contact with the inner peripheral surface of the lower segment on a cross section of the combination oil ring, which is taken along the axial direction of the cylinder, when a protrusion amount from an outer peripheral-side end surface of the expander spacer to an outer peripheral surface vertex of the upper segment is an upper protrusion amount P1, a protrusion amount from the outer peripheral-side end surface of the expander spacer to an outer peripheral surface vertex of the lower segment is a lower protrusion amount P2, and a difference between the upper protrusion amount P1 and the lower protrusion amount P2 is P, a condition of P=P1−P2>0 is satisfied, wherein, on the cross section of the combination oil ring, which is taken along the axial direction of the cylinder, under a state in which the combination oil ring is inserted into the cylinder bore, a center axis of the expander spacer is rotated and inclined upward at a predetermined angle over an entire circumference of the expander spacer in a circumferential direction of the combination oil ring, the inclined surface of the upper ear portion of the expander spacer is held in contact with the inner peripheral surface of the upper segment, the inclined surface of the lower ear portion of the expander spacer is held in contact with the inner peripheral surface of the lower segment, an upper surface of an inner peripheral surface-side part of the upper segment is held in pressure contact with the oil ring groove upper surface over an entire circumference of the upper segment, a lower surface of an inner peripheral surface-side part of the lower segment is held in pressure contact with the oil ring groove lower surface over an entire circumference of the lower segment, and the outer peripheral surface vertex of the upper segment and the outer peripheral surface vertex of the lower segment are held in pressure contact with a bore wall surface over the entire circumference of the upper segment and the entire circumference of the lower segment, respectively.

2. The combination oil ring according to claim 1, wherein, when, in a radial direction of the combination oil ring, a thickness of the upper segment is set to $a1u$ [mm], a thickness of the lower segment is set to $a1d$ [mm], a spacer thickness of the expander spacer on the upper segment side is set to $a8u$ [mm], and a spacer thickness of the expander spacer on the lower segment side is set to $a8d$ [mm], the following Expression (1), Expression (2), and Expression (3) are satisfied:

$$Q1 = a1u - a8u > P1 > 0 \quad (1)$$

$$Q2 = a1d - a8d > P2 > 0 \quad (2), \text{ and}$$

when a condition of Q1−P1=Q1−P2 is satisfied, Q1−Q2=P1−P2 is established, and $$Q = Q1 - Q2 = (a1u - a8u) - (a1d - a8d) > 0 \quad (3)$$

where Q1 is an upper apparent protrusion amount,

Q2 is a lower apparent protrusion amount, and

Q is a difference (Q1−Q2) between the upper apparent protrusion amount Q1 and the lower apparent protrusion amount Q2.

3. The combination oil ring according to claim 2, wherein, when the following Expression (4) is established:

$$a8u = a8d \quad (4),$$

the following Expression (5) is satisfied:

$$Q = a1u - a1d > 0 \quad (5).$$

4. The combination oil ring according to claim 2, wherein, when the following Expression (6) is established:

$$a1u = a1d \quad (6),$$

the following Expression (7) is satisfied:

$$a8u < a8d \quad (7).$$

5. The combination oil ring according to claim 2, wherein the upper apparent protrusion amount Q1 or the lower apparent protrusion amount Q2, and the difference Q between the upper apparent protrusion amount Q1 and the lower apparent protrusion amount Q2 satisfy the following Expression (8) and Expression (9):

$$0.15 \leq Q1 \text{ or } Q2 \leq 0.65 \quad (8), \text{ and}$$

$$0.06 < Q \leq 0.23 \quad (9).$$

6. The combination oil ring according to claim 1, wherein, when a nominal width dimension of the upper segment is set to $h12u$ [mm], a nominal width dimension of the lower segment is set to $h12d$ [mm], an upper ear angle, which is an acute angle formed between the inclined surface of the upper ear portion of the expander spacer and the axial direction of the cylinder, is set to $\theta u$ [degrees], and a lower ear angle, which is an acute angle formed between the inclined surface of the lower ear portion of the expander spacer and the axial direction of the cylinder, is set to $\theta d$ [degrees], the nominal width dimension $h12u$ or the nominal width dimension $h12d$ falls within a range of from 0.3 [mm] to 0.6 [mm] and the upper ear angle $\theta u$ or the lower ear angle $\theta d$ falls within a range of from 5 [degrees] to 30 [degrees], and the difference Q between the upper apparent protrusion amount Q1 and the lower apparent protrusion amount Q2 satisfies a dimensional range expressed by the following Expression (10) or a dimensional range expressed by the following Expression (11):

when the nominal width dimension $h12u$ or the nominal width dimension $h12d$ falls within a range of from 0.3 [mm] to 0.45 [mm], $$0.085 \text{ [mm]} \leq Q \leq 0.18 \text{ [mm]} \quad (10), \text{ or}$$

when the nominal width dimension $h12u$ or the nominal width dimension $h12d$ is larger than 0.45 [mm] and equal to or smaller than 0.60 [mm], $$0.110 \text{ [mm]} \leq Q \leq 0.23 \text{ [mm]} \quad (11).$$

7. The combination oil ring according claim 1, wherein, when a nominal width dimension of the upper segment is set to $h12u$ [mm], and a nominal width dimension of the lower segment is set to $h12d$ [mm], the following Expression (12) is satisfied:

$$h12u < h12d \quad (12).$$

8. The combination oil ring according to claim 1, wherein, in a case in which a side clearance in the combination oil ring under the free state is a free-state side clearance Sf [mm], and a state in which the piston including the combination oil ring assembled therein is mounted inside the cylinder bore is replaced to a closed state in which the combination oil ring is equipped in a measurement device having an annular shape, in which the measurement device has a recessed groove with a nominal width h1 [mm] of the combination oil ring, the recessed groove corresponds to the oil ring groove of the piston with a nominal diameter d1 [mm] of the combination oil ring, and that replacement conforms to JIS B8032-1:2016 (ISO 6621-1:2007) and JIS B8032-2:2016 (ISO 6621-2:2003), when a side clearance in the combination oil ring under the closed state is a closed-state side clearance Sc [mm], the free-state side clearance Sf and the closed-state side clearance Sc have a relationship of Sc<Sf.

9. The combination oil ring according to claim 5, wherein, when a nominal width dimension of the upper segment is set to h12u [mm], and
a nominal width dimension of the lower segment is set to h12d [mm], the following Expression (12) is satisfied:

$$h12u < h12d \qquad (12).$$

10. The combination oil ring according to claim 6, wherein, when a nominal width dimension of the upper segment is set to h12u [mm], and
a nominal width dimension of the lower segment is set to h12d [mm], the following Expression (12) is satisfied:

$$h12u < h12d \qquad (12).$$

11. The combination oil ring according to claim 5,
wherein, in a case in which a side clearance in the combination oil ring under the free state is a free-state side clearance Sf [mm], and
a state in which the piston including the combination oil ring assembled therein is mounted inside the cylinder bore is replaced to a closed state in which the combination oil ring is equipped in a measurement device having an annular shape, in which the measurement device has a recessed groove with a nominal width h1 [mm] of the combination oil ring, the recessed groove corresponds to the oil ring groove of the piston with a nominal diameter d1 [mm] of the combination oil ring, and that replacement conforms to JIS B8032-1:2016 (ISO 6621-1:2007) and JIS B8032-2:2016 (ISO 6621-2:2003), when a side clearance in the combination oil ring under the closed state is a closed-state side clearance Sc [mm], the free-state side clearance Sf and the closed-state side clearance Sc have a relationship of Sc<Sf.

12. The combination oil ring according to claim 6,
wherein, in a case in which a side clearance in the combination oil ring under the free state is a free-state side clearance Sf [mm], and
a state in which the piston including the combination oil ring assembled therein is mounted inside the cylinder bore is replaced to a closed state in which the combination oil ring is equipped in a measurement device having an annular shape, in which the measurement device has a recessed groove with a nominal width h1 [mm] of the combination oil ring, the recessed groove corresponds to the oil ring groove of the piston with a nominal diameter d1 [mm] of the combination oil ring, and that replacement conforms to JIS B8032-1:2016 (ISO 6621-1:2007) and JIS B8032-2:2016 (ISO 6621-2:2003), when a side clearance in the combination oil ring under the closed state is a closed-state side clearance Sc [mm], the free-state side clearance Sf and the closed-state side clearance Sc have a relationship of Sc<Sf.

13. The combination oil ring according to claim 7,
wherein, in a case in which a side clearance in the combination oil ring under the free state is a free-state side clearance Sf [mm], and
a state in which the piston including the combination oil ring assembled therein is mounted inside the cylinder bore is replaced to a closed state in which the combination oil ring is equipped in a measurement device having an annular shape, in which the measurement device has a recessed groove with a nominal width h1 [mm] of the combination oil ring, the recessed groove corresponds to the oil ring groove of the piston with a nominal diameter d1 [mm] of the combination oil ring, and that replacement conforms to JIS B8032-1:2016 (ISO 6621-1:2007) and JIS B8032-2:2016 (ISO 6621-2:2003), when a side clearance in the combination oil ring under the closed state is a closed-state side clearance Sc [mm], the free-state side clearance Sf and the closed-state side clearance Sc have a relationship of Sc<Sf.

* * * * *